United States Patent [19]
Vinciarelli et al.

[11] Patent Number: 5,668,466
[45] Date of Patent: Sep. 16, 1997

[54] REVERSE ENERGY TRANSFER IN ZERO-CURRENT SWITCHING POWER CONVERSION

[75] Inventors: Patrizio Vinciarelli, Boston; Jay Prager, Tyngsboro, both of Mass.

[73] Assignee: VLT Corporation, San Antonio, Tex.

[21] Appl. No.: 459,126

[22] Filed: Jun. 2, 1995

Related U.S. Application Data

[62] Division of Ser. No. 449,698, May 24, 1995.

[51] Int. Cl.$^6$ ........................................... G05F 1/613
[52] U.S. Cl. ........................ 323/282; 323/224; 363/16
[58] Field of Search ........................ 363/16; 323/224, 323/225, 282, 287

[56] References Cited

U.S. PATENT DOCUMENTS

| | | | |
|---|---|---|---|
| 4,415,959 | 11/1983 | Vinciarelli | 363/21 |
| 4,441,146 | 4/1984 | Vinciarelli | 363/20 |
| 4,720,667 | 1/1988 | Lee et al. | 323/271 |
| 4,829,232 | 5/1989 | Erickson, Jr. | 323/290 |
| 5,235,502 | 8/1993 | Vinciarelli | 363/20 |
| 5,321,348 | 6/1994 | Vinciarelli et al. | 323/222 |
| 5,432,431 | 7/1995 | Vinciarelli et al. | 323/222 |
| 5,486,752 | 1/1996 | Hua et al. | 323/282 X |

OTHER PUBLICATIONS

Vinciarelli et al., U.S. Patent application Ser. No. 08/274,991, filed Jul. 13,1994, "AC to DC Boost Power Converters".

Vinciarelli et al., U.S. Patent application Ser. No. 08/224,834, filed Apr. 8, 1994, "Efficient Power Conversion".

Liu et al., "Resonant Switches —A Unified Approach to Improve Performances of Switching Converters," IEEE International Telecommunications Conference, 1984 Proceedings, pp. 344–351.

Liu et al., "Resonant Switches—Topologies and Characteristics," PESC '85 Record, 16th Annual IEEE Power Electronics Specialists Conference, pp. 106–116.

*Primary Examiner*—Peter S. Wong
*Assistant Examiner*—Y. J. Han
*Attorney, Agent, or Firm*—Fish & Richardson P.C.

[57] ABSTRACT

A zero-current switching converter converts power from an input source for delivery to a load. In the converter, a switch opens and closes at times of essentially zero current to enable energy transfer back and forth between said input source and said converter. A controller is connected to control the switch to initiate, during a first portion of each of a succession of converter operating cycles, forward energy transfer from said input source; and in at least some of said converter operating cycles, also to initiate reverse energy transfer to said input source at times not contiguous with said first portion.

6 Claims, 34 Drawing Sheets

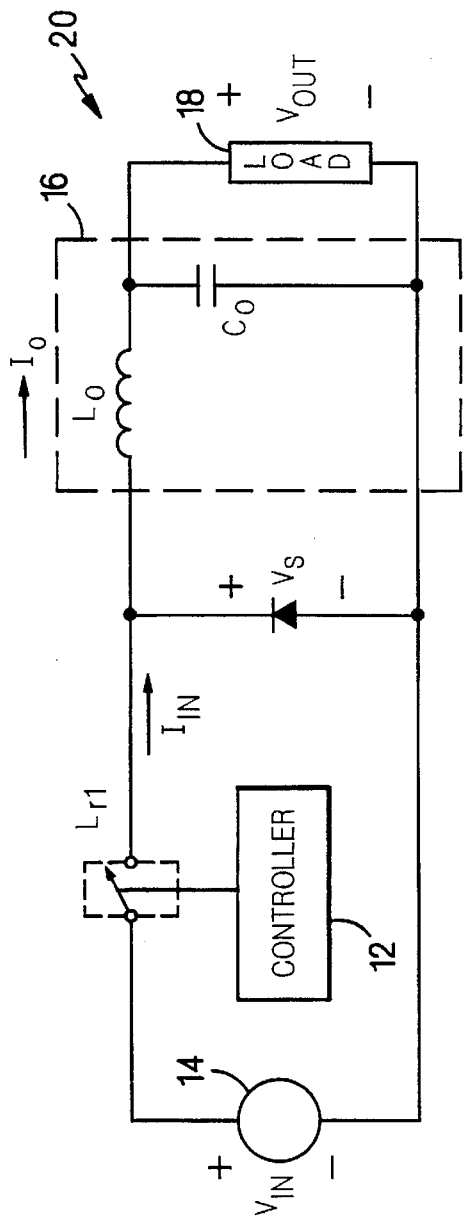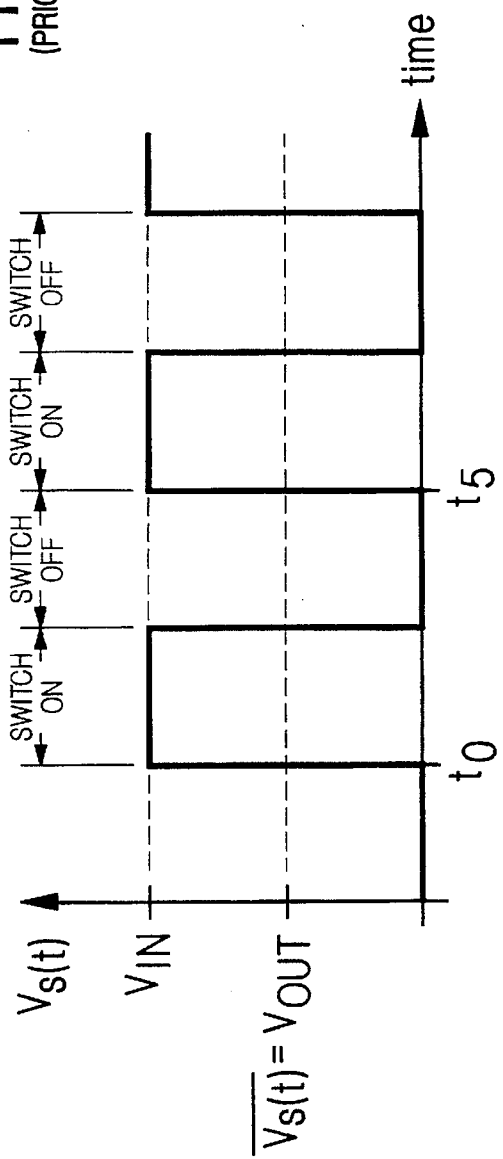
FIG. 2
(PRIOR ART)

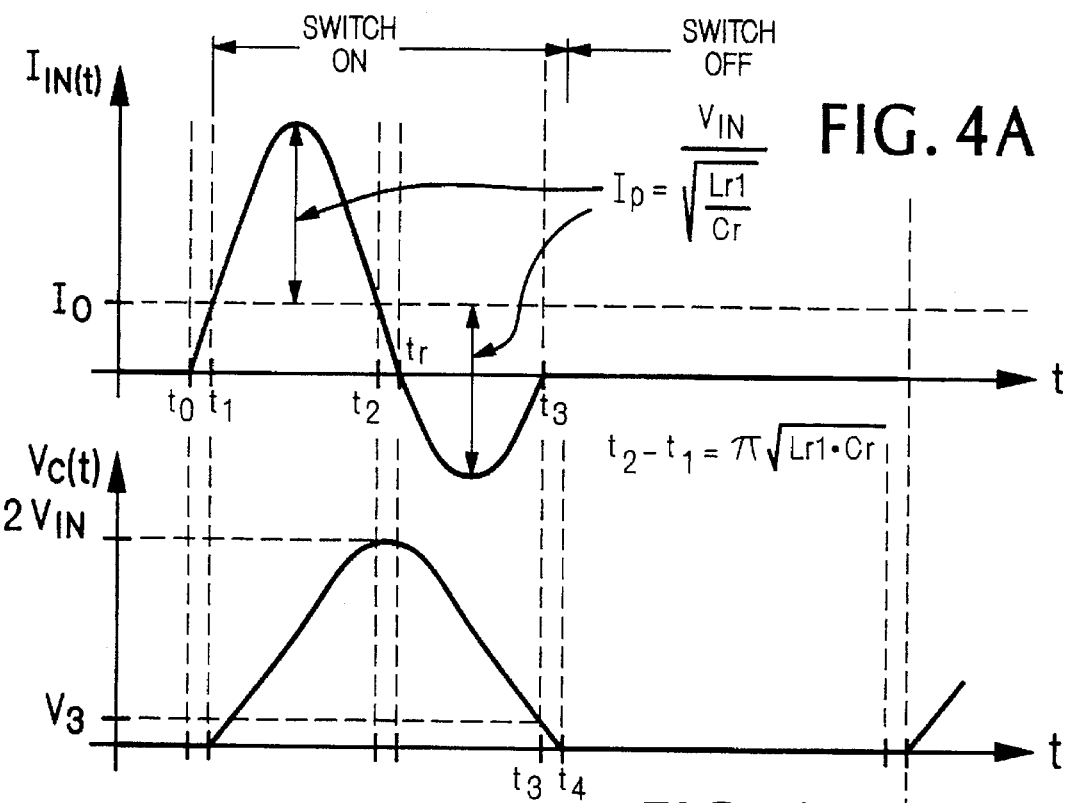
FIG. 4A
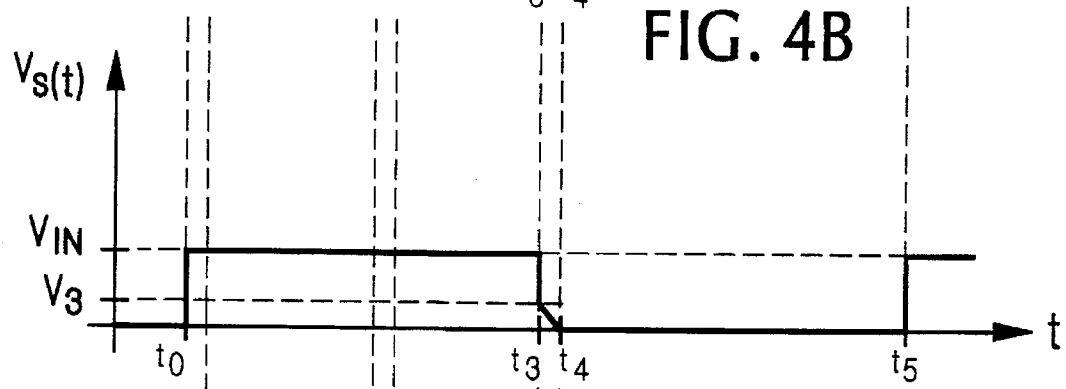
FIG. 4B
FIG. 4C
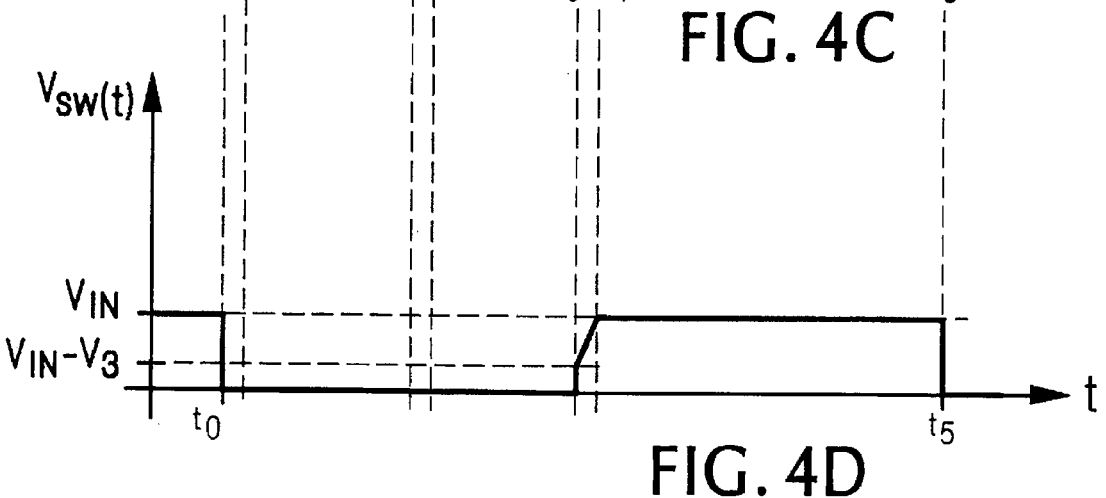
FIG. 4D

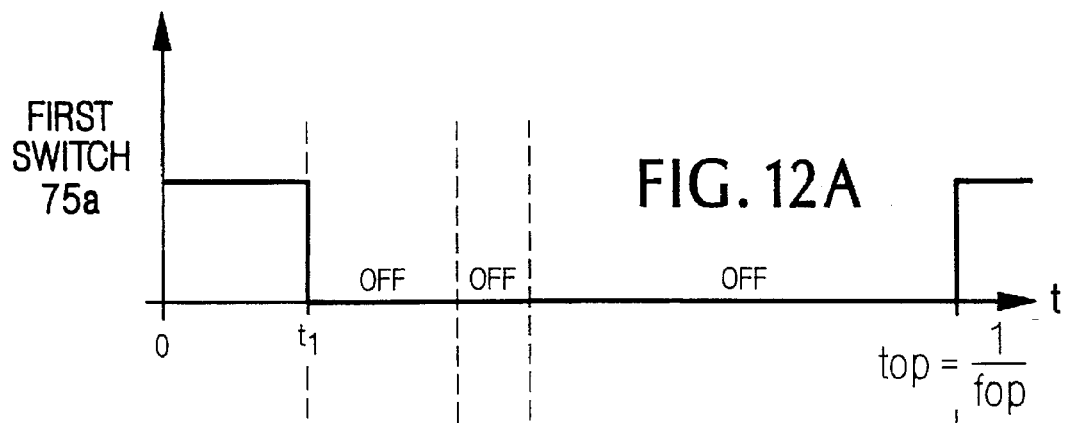
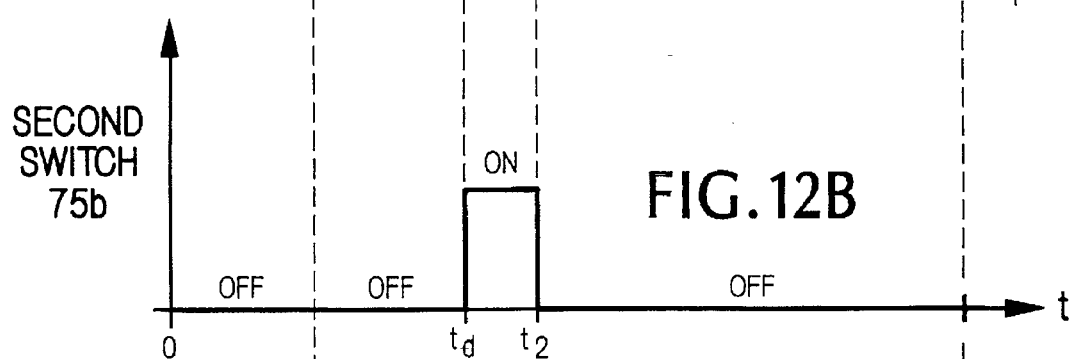
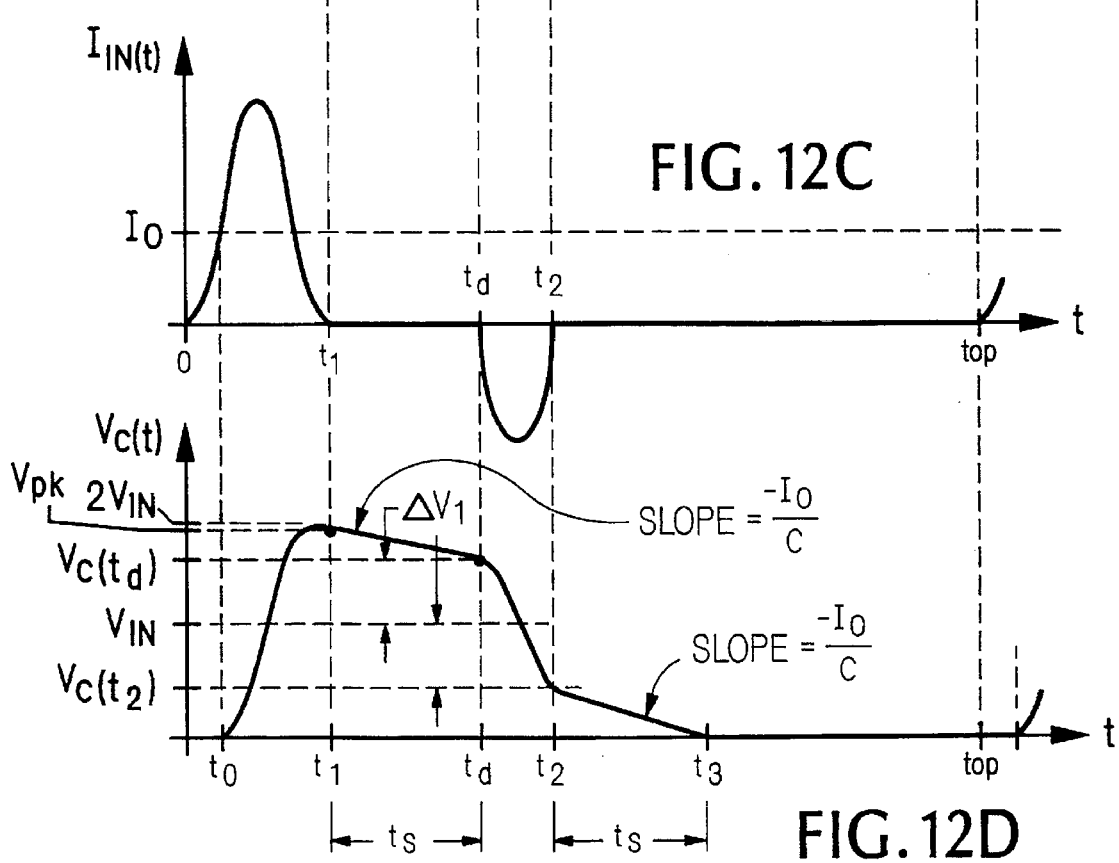

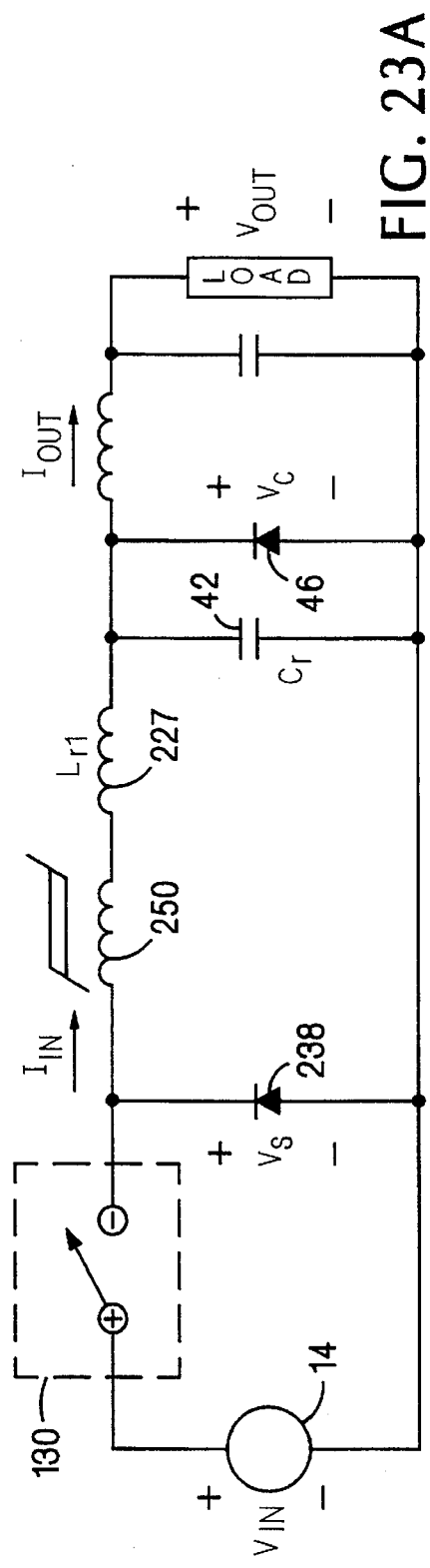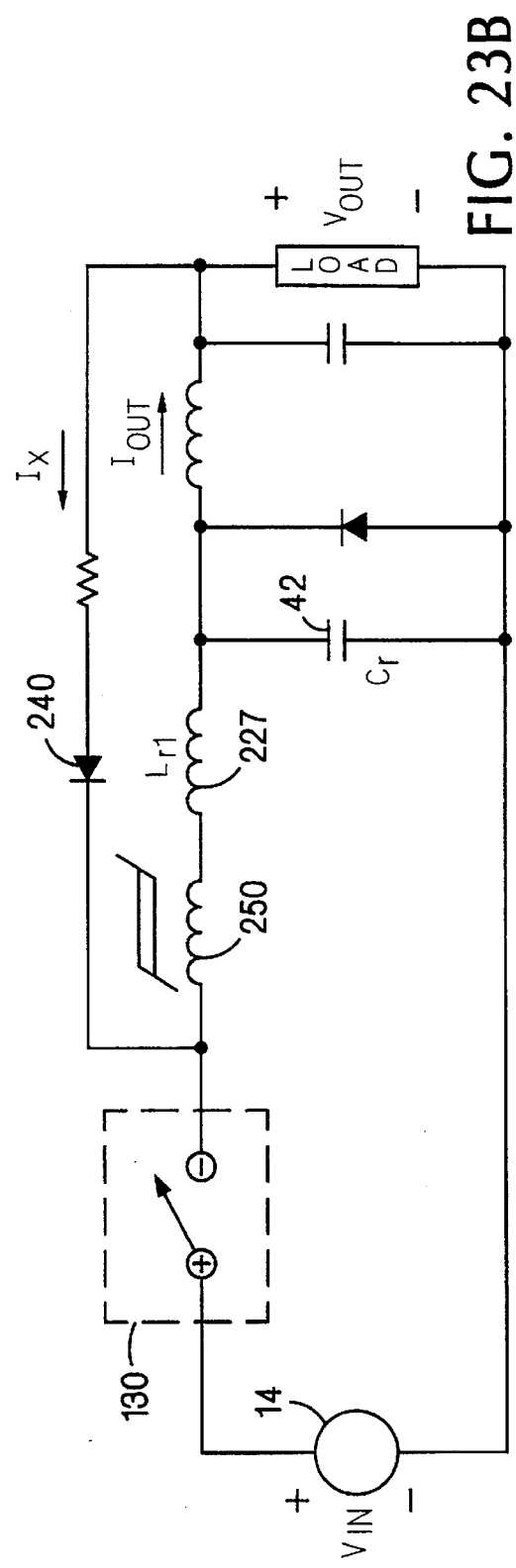
FIG. 23A
FIG. 23B

REVERSE ENERGY TRANSFER IN ZERO-CURRENT SWITCHING POWER CONVERSION

This is a divisional of copending application Ser. No. 08/449,698, filed May 24, 1995.

This invention relates to zero-current switching power conversion.

FIG. 1 shows a circuit schematic of an idealized non-isolated ZCS buck converter 10. The converter may be operated in either a half-wave or a full-wave mode of operation. In either case, the switch 25 is closed by the ZCS switch controller 12 at a time of zero flow of current Iin. In the half-wave mode the switch 25 is opened by the ZCS switch controller 12 on the occurrence of the first zero crossing of current following switch closure. Waveforms for the half-wave mode are shown in FIGS. 3A through 3D. In the full wave mode the switch 25 is opened by the ZCS switch controller 12 on the occurrence of the second (or any even numbered) zero crossing following switch closure. Waveforms for the full-wave mode are shown in FIG. 4A through 4D. An output filter 16 in the converter 10 filters the pulsating voltage Vc(t) to deliver an essentially DC output voltage, Vout, across the load. In the converter 10, a frequency controller 15 compares the converter output voltage, Vout, to a reference value (indicative of some desired value of Vout, but not shown) and sets the converter operating frequency, fop, to a value consistent with maintaining Vout at the desired value. The frequency fop, delivered to the ZCS switch controller 12, controls the rate of occurrence of operating cycles (e.g., fop=1/($t5-t0$) in FIGS. 2, 3 and 4). In general, a ZCS converter will exhibit higher conversion efficiency than a conventional pulse-width modulated ("PWM") buck converter (20, FIG. 2) because opening and closing the switch 25 at essentially zero current results in a substantial reduction in switching losses. The reduction in switching losses allows for an increase in converter operating frequency and a corresponding decrease in the size of a ZCS converter relative to its PWM counterpart.

In half-wave mode, a finite and bounded amount of energy is withdrawn by the converter from the input source 14 during each converter operating cycle (the "half-wave" energy) and all of this energy is delivered to the load during the cycle. As a result, maintaining a constant load voltage requires that converter operating frequency be varied essentially in proportion to the converter load. If the converter is operated in full-wave mode, the first half of the operating cycle is identical to the half-wave operating mode and an amount of energy equal to the half-wave energy is withdrawn from the input source 14. However, during the second half of the operating cycle (between the first and second zero crossings) a portion of this energy is returned to the input source 14 with the remainder being delivered to the load. In the full-wave mode, the ratio of the amount of the energy which is returned to the source 14 to the amount of the energy which is provided to the load varies with converter loading; as a result, converter operating frequency tends to be relatively constant and independent of load. The half-wave ZCS converter is a "quantized" converter in the sense that a predictable amount of energy is delivered to the load during each converter operating cycle. This is in contrast to the full-wave ZCS converter in which a variable fraction of the total half-wave energy extracted from the input source is actually delivered to the load during each operating cycle.

Processing of energy in the half-wave mode is potentially more efficient than in full-wave mode since all of the energy which is delivered to the converter during each operating cycle is transferred forward to the load without recirculation. In practical converter embodiments, losses in circuit elements occur as result of both the forward and the reverse flow of energy. In the half-wave converter there is no reverse energy flow and the reduction in operating frequency with decreasing load results in conversion efficiency remaining relatively high over a wide range of loads. In the full-wave converter, the combination of reverse energy flow and a relatively constant, high, operating frequency mitigate toward a reduction in conversion efficiency as load is reduced. Another benefit of the quantized nature of half-wave conversion is that half-wave ZCS converters operating in synchronism will accurately share in the power delivered to a load; practical embodiments of full-wave converters will not. On the other hand, the relatively constant, high, operating frequency of the full-wave mode mitigates toward both a smaller converter (e.g., the breakpoint frequency of the converter output filter may be raised, thereby reducing the size of the filter components) and improved converter performance (e.g., the higher output filter breakpoint frequency will allow wider overall converter bandwidth and a concomitant improvement in transient response).

Examination of the waveforms of FIGS. 3 and 4 show that the switch in a half-wave ZCS converter must be able to carry a unipolar current and be capable of blocking a bipolar voltage, whereas the switch in the full-wave converter must carry a bipolar current and block a unipolar voltage. As a practical matter, semiconductor switching elements which can block a bipolar voltage when off and which exhibit switching speeds consistent with efficient converter operation at relatively high operating frequencies (e.g. 500 KHz or 1 MHZ) are not currently available. For example, FIG. 5A shows a ZCS buck converter 30 using a MOSFET transistor 26 as the switching element. Such a device is not capable of supporting a bipolar voltage due to the "intrinsic" diode 31 inherent to the MOSFET. As a result, while the converter embodiment of FIG. 5A may be used in the full-wave operating mode (the MOSFET switch is turned on to conduct the positive current flow of Iin; the diode will conduct the negative flow; the switch need only block a unipolar voltage) it cannot be used in the half-cycle mode. A ZCS converter 30, adapted to operate in half cycle mode and shown in FIG. 5B, includes a composite switch 125, comprising a diode 38 in series with a MOSFET switch 26, capable of blocking negative values of Vsw. The losses attendant to the flow of current Iin in this diode results in a reduction in conversion efficiency. Similar considerations apply if a bipolar switch is used in a ZCS converter: in a half-wave converter a series diode (38, FIG. 6A) will generally be needed to form a composite switch 25a capable of blocking negative values of Vsw; in a full-wave converter an anti-parallel diode (34, FIG. 6B) is required to conduct negative flow of Iin.

While the preceding discussion has been directed to a particular ZCS conversion topology (the non-isolated buck converter) it is more generally applicable to a wide variety of ZCS conversion topologies. For example, both isolated and non-isolated ZCS converters of the buck, boost, buck-boost, forward, flyback, Cuk, transformer coupled Cuk and SEPIC topologies are described in Liu, et al, "Resonant Switches—A Unified Approach to Improve Performances of Switching Converters," IEEE International Telecommunications Conference, 1984 Proceedings, pp. 344–351; Liu, et al, "Resonant Switches—Topologies and Characteristics," PESC '85 Record, 16th Annual IEEE Power Electronics Specialists Conference, pp. 106–16; in Vinciarelli, et al, "Boost Switching Power Conversion," U.S. Pat. No. 5,321, 348, Jun. 14, 1994; and in Lee, et al, "Zero-Current Switching Quasi-Resonant Converters Operating in a Full-Wave Mode," U.S. Pat. No. 4,720,667, Jan. 19, 1988 (all incorporated herein by reference). The references illustrate the use of diodes in series or in parallel with MOSFET and bipolar switches to adapt the switches to half-wave or full-wave operation and also discuss the concept of the "resonant switch" as applied to ZCS conversion. In general, the resonant switch concept provides for replacing a switching element in a PWM converter topology with a resonant switch comprising a switching element, a capacitor, an inductor and one or more diodes (depending on whether the application is a half-wave or full-wave) to create a corresponding ZCS topology.

Means for limiting the minimum operating frequency of a half-wave ZCS converter are described in Vinciarelli, et al, "Zero Current Switching Forward Power Conversion With Controllable Energy Transfer," U.S. Pat. No. 5,235,502, Aug. 10, 1993; in Vinciarelli, "Zero Current Switching Forward Power Conversion Operating in Damped Reverse Boost Mode," U.S. Pat. No. 5,291,385, Mar. 1, 1994; and in Vinciarelli, "Power Conversion in Anticipatory Reverse Boost Mode," U.S. patent application Ser. No. 08/187,296, filed Jan. 27,1994 (all incorporated herein by reference). Each of the referenced techniques exploits the fact that there is a value of converter loading below which there will be a reversal of the flow of current in the output inductor 50 during a portion of the operating cycle. By adding a second switch 44 in parallel with the resonant capacitor 42 (FIG. 7), and timing the opening and the closing of the second switch 44 to control the charging of the capacitor 42 via the reverse flow of Io, the amount of energy transferred forward during each operating cycle can be reduced, thereby requiring a higher converter operating frequency than that which would otherwise be required to transfer the particular amount of power to the load.

Saturable inductors are well known. They typically consist of a winding on a magnetic core having a known value of saturation flux density (where the "saturation flux density" is the value of flux density below which the permeability of the core is relatively high and above which the value of the permeability of the core is relatively low), exhibit a relatively high value of inductance at relatively low values of current (e.g. values which do not cause the flux density in the core to exceed the saturation flux density) and a relatively much lower value of inductance at relatively higher currents (e.g. values which would otherwise cause the flux density in the core to exceed the saturation flux density). Viewed another way; if a voltage is applied across a saturable inductor the flux in the core which links the winding, at any instant in time, will be proportional to the time integral of the voltage across the winding (i.e. the "volt-seconds" applied to the device). If the applied "volt-seconds" exceeds a certain value (dependent upon the number of turns in the winding and the dimensions and saturation flux density of the core) the magnetic flux linking the core will exceed the saturation flux density and the inductance of the device will drop.

Using a saturable inductor to modify the shape of the current and voltage waveforms in both half-wave and full-wave ZCS converters, of both the buck and boost types, is described in Erikson, "Nonlinear Resonant Switch and Converter," U.S. Pat. No. 4,829,232, May 9, 1989. In Erikson's converter the saturable inductor is used in place of a fixed resonant inductor (e.g., inductor 27, FIG. 1) and arranged to saturate and assume a low inductance value at low values of current and to unsaturate and assume a high inductance value at high currents. This causes the characteristic time constant for the converter to increase with increasing switch current, resulting in a current waveform which exhibits relatively fast rise and fall times separated by a longer, relatively flat, central region. This reduce the rms value of the current which flows in the switch (and in the series diode in the half-wave converter), thereby improving converter efficiency.

Using saturable inductors in combination with a switching element having unipolar voltage blocking capability to provide a composite switch capable of blocking a time-varying voltage which exhibits a brief reversal in polarity is described in Vinciarelli, et al, "Boost Switching Power Conversion Using Saturable Inductors," U.S. patent application Ser. No. 07/887,486 (incorporated by reference). That application describes a ZCS boost converter topology which, as illustrated in FIG. 8, exhibits a bipolar capacitor voltage, Vc(t), when operated in the short-cycle operating mode. Ordinarily, the switch 39 would have to be able to withstand a bipolar voltage for a period of time following the opening of the switch (e.g., between times ta ant tb in the waveform). One way to achieve this would be to place a diode in series with the switch 39; another way, described in that application, is to connect a saturable inductor 37, having a volt-second capability sufficiently large to support the voltage Vc(t) throughout the time that the voltage is negative (e.g., between times ta and tb) subsequent to the switch being opened, in series with the switch 39. A general class of ZCS boost converters using coupled inductors, and semiconductor switch topologies for use in both half-wave and full-wave versions of the converters, are described in Vinciarelli, et al, "Boost Switching Power Conversion," U.S. Pat. No. 5,321,348, Jun. 14, 1994 (incorporated by reference).

ZCS boost converters which deliver a DC output but which are operated directly from an AC (e.g., bipolar) input source are described in Vinciarelli, et al, "AC to DC Boost Power Converters," U.S. patent application Ser. No. 08/274,991, filed Jul. 13, 1994 (incorporated by reference).

SUMMARY OF THE INVENTION

In general, in one aspect, the invention features a zero-current switching converter for converting power from an input source for delivery to a load. In the converter, a switch opens and closes at times of essentially zero current to enable energy transfer back and forth between said input source and said converter. A controller is connected to control the switch to initiate, during a first portion of each of a succession of converter operating cycles, forward energy transfer from said input source; and in at least some of said converter operating cycles, also to initiate reverse energy transfer to said input source at times not contiguous with said first portion.

Implementations of the invention may include one or more of the following features. The forward energy transfer may be initiated by closing the switch. The reverse energy transfer may also be initiated by closing said switch. The initiation of reverse energy transfer may occur a predetermined time after the beginning of the first portion. The minimum frequency of the converter operating cycles may be controlled by controlling a time delay between the beginning of the first portion and the initiation of the reverse energy transfer. There may be circuit elements (e.g., an inductor and a capacitor) which set a characteristic time constant for the rise and fall of a flow of current after the switch is closed. There may be a saturable inductor and the time between the beginning of the first portion and the initiation of reverse energy transfer may be determined by the volt-second characteristic of the saturable inductor. Energy may be transferred forward from the input source to the capacitor during the first portion and may be transferred from the capacitor back to the input source during the reverse energy transfer. The switch may include two switching elements each connected to transfer energy between the input source and the converter. A first switching element, connected in series with a first (e.g., saturable) inductor, may set a characteristic time constant associated transfer of energy from the input source. A second switching element, connected in series with a second (e.g., saturable) inductor, may set a characteristic time constant associated with the transfer of energy toward the input source. A saturable inductor may be connected to carry the current (currents) which flows in the switching element (elements).

The zero-current switching converter may be a buck converter, a boost converter, and AC-DC boost converter, a buck-boost converter, a Cuk converter a SEPIC converter, a non-isolated converter, or an isolated converter, among others.

There may be circuitry for reducing the volt-seconds required to bring the inductor from an unsaturated to a saturated state. The input source may include a unipolar voltage. The switch may be connected in series with the input source and the first inductor. There may be an output filter connected between the capacitor and the load for delivering energy from the capacitor to the load at an average voltage essentially equal to the average voltage across the capacitor. A diode may be connected in parallel with the capacitor and poled to block a voltage of the polarity of the average voltage. An input inductor may be connected in series with the input source and the series circuit, and a diode may be connected between the capacitor and the load, the diode poled to conduct current in a direction to deliver energy from the input source to the load. The switching element may be a unidirectional switch poled to block the voltage delivered by the input source when the switching element is open. The saturable inductor may be arranged to exhibit a relatively high unsaturated impedance during portions of the operating cycle during which reverse voltage would otherwise have to be blocked by the switching element. The input source may be a bipolar voltage source, the capacitor may be connected in parallel with the series circuit comprising the switch and the first inductor, an input inductor may be connected in series with the input source and the series circuit, and a rectifier may be connected between the dual-mode switch and the load, the rectifier accepting a bipolar input current and delivering a unipolar output current to the load. The inductance may be the leakage inductance of a leakage-inductance transformer comprising a primary winding and a secondary winding. The first switching element may be connected in series with the primary winding. A second switching element may be connected in series with both the secondary winding and the capacitor, the first switching element and the primary winding being connected in series with the input source. An output filter may be connected between the capacitor and the load for delivering energy from the capacitor to the load at an average voltage essentially equal to the average voltage across the capacitor. A diode may be connected in parallel with the capacitor and poled to block a voltage of the polarity of the average voltage.

The reverse energy transfer may be initiated if the voltage across the capacitor is greater than the voltage delivered by the input source. The reverse energy transfer may be initiated if the voltage across the capacitor is at a value such that the absolute value of the incremental change in the capacitor voltage which must occur to enable current to flow into the load is greater than the voltage across the load.

In general, in another aspect, the invention features a method of controlling the minimum operating frequency of a zero-current switching converter which transfers power from an input source for delivery to a time-varying load by opening and closing a switch at times of zero current flow. In a first portion of each of a series of converter operating cycles, the switch is controlled to initiate forward energy transfer from the input source. In response to changes of the load, during each of some of the converter operating cycles and at times which are not contiguous with the first portion, controlling the switch to initiate reverse energy transfer to the input source.

Implementations of the invention may include one or more of the following features. A fixed time delay may be caused between the beginning of the first portion and the initiation of the reverse energy transfer. The time delay between the beginning of the first portion and the initiation of the reverse energy transfer may be selectively adjusted. The volt-second characteristic of a saturable inductor may be adapted to effect a controlled time delay between the beginning of the first portion and the initiation of the reverse energy transfer. The reverse energy transfer may be initiated if doing so will result in energy being transferred from the converter back to the input source. The reverse energy transfer may be initiated on the basis of a voltage measured across a capacitor.

Other features and advantages of the invention will become apparent from the following description and from the claims.

DESCRIPTION

FIG. 2 shows a prior art non-isolated pulse-width modulated buck converter.

FIGS. 4A–4D show waveforms for the ZCS converter of FIG. 1 when operated in the full-wave mode of operation.

FIGS. 12A through 12D show waveforms for the converter of FIG. 10.

FIGS. 23A and 23B show means for resetting the saturable inductor in converters.

Figure 1:
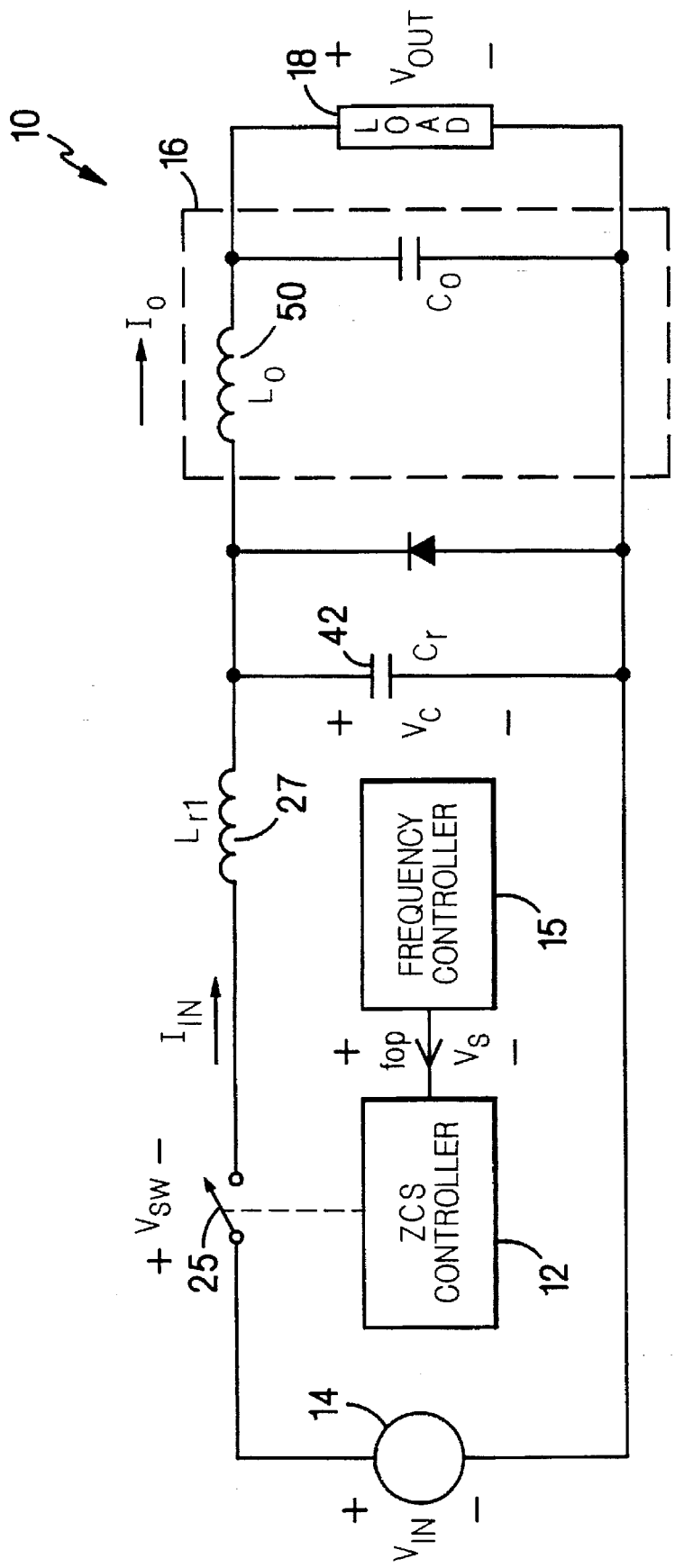
FIG. 1 shows a prior art non-isolated zero-current switching buck converter.
Figure 3A:
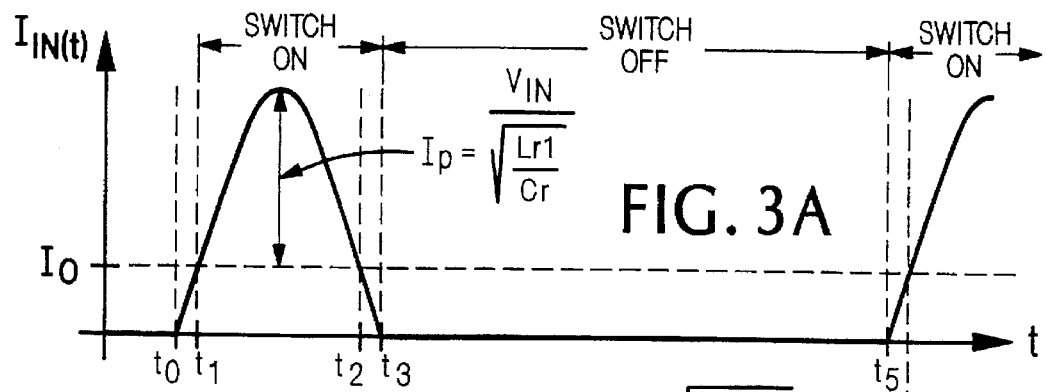
FIGS. 3A–3D show waveforms for the ZCS converter of FIG. 1 when operated in the half-wave mode of operation.
Figure 3B:
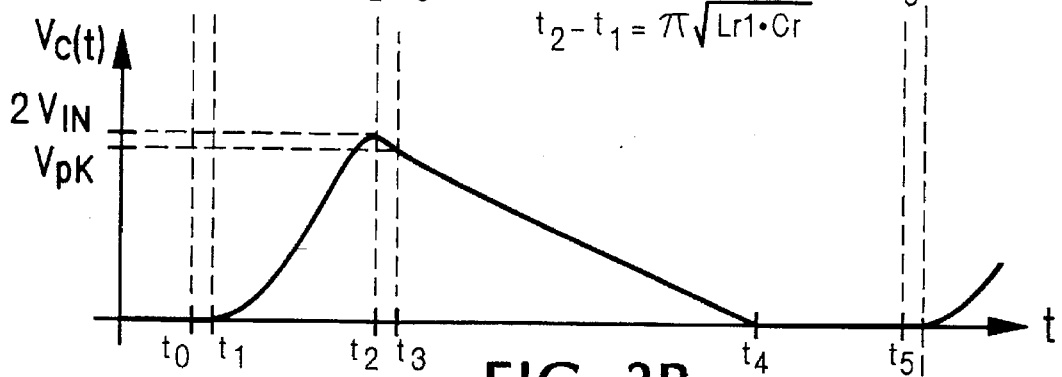
Figure 3C:
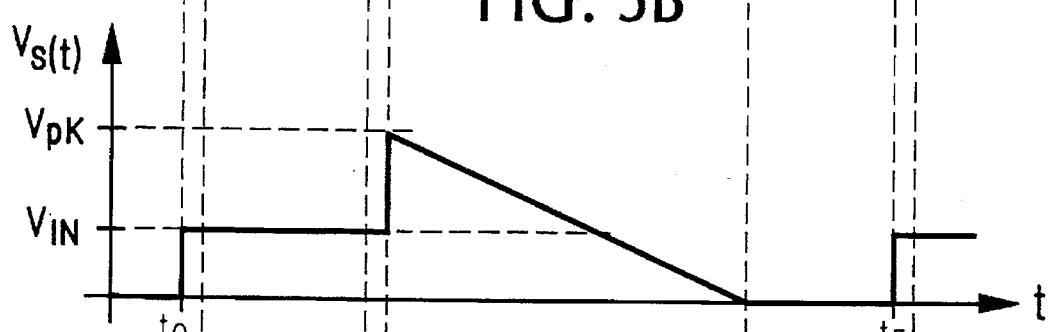
Figure 3D:
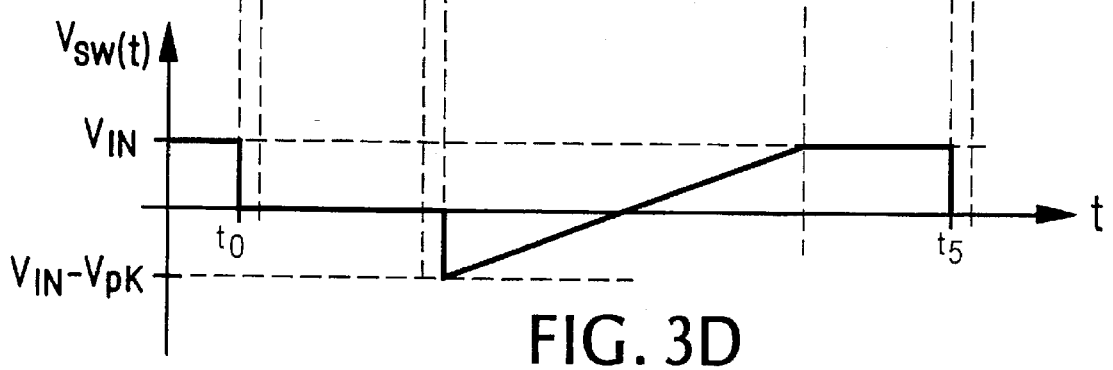
Figure 9A:
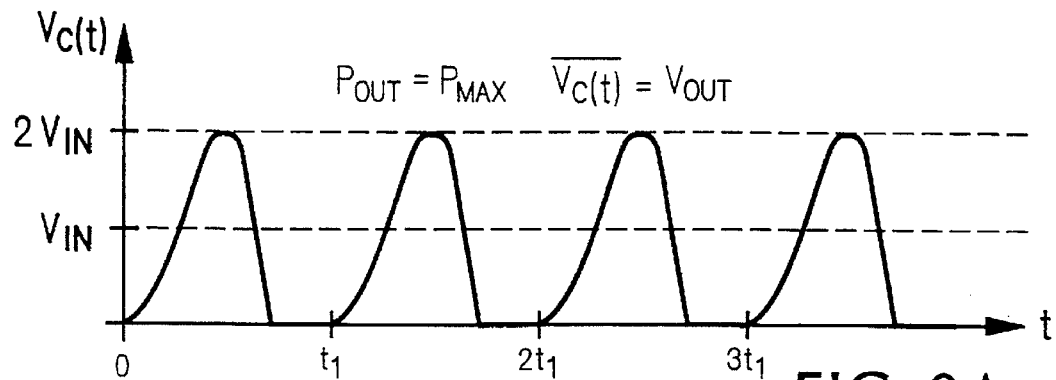
FIGS. 9A through 9D show capacitor voltage waveforms for the converter of FIG. 1 at different values of load.
Figure 9B:
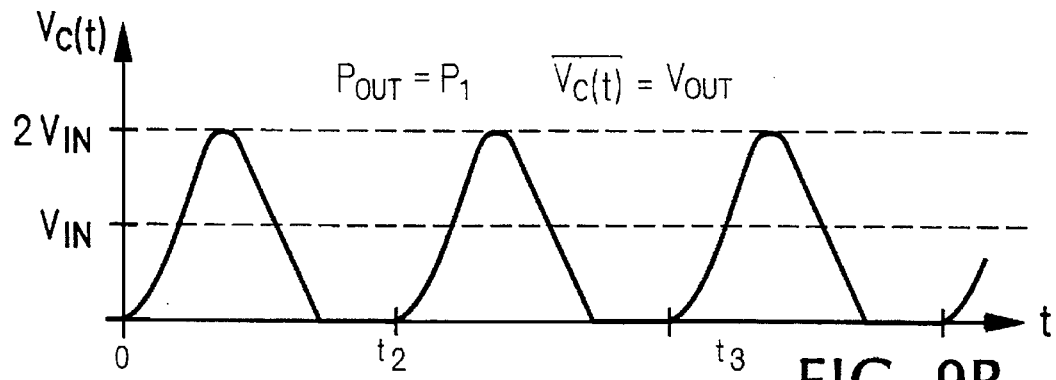
Figure 9C:
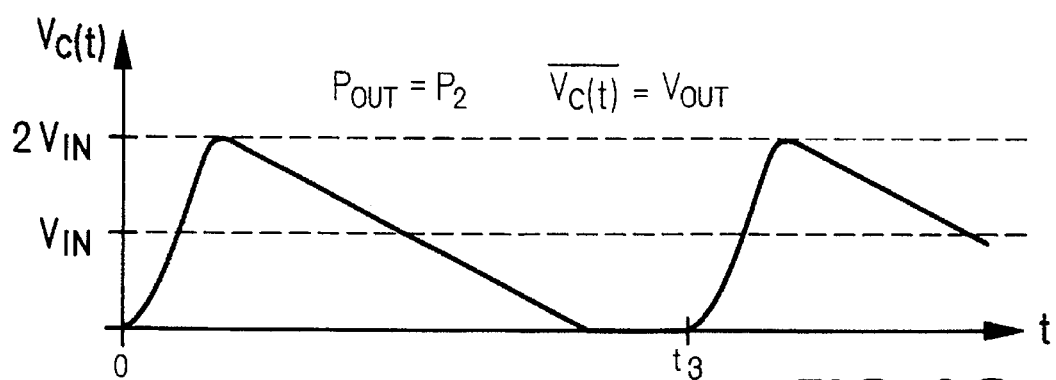
Figure 9D:
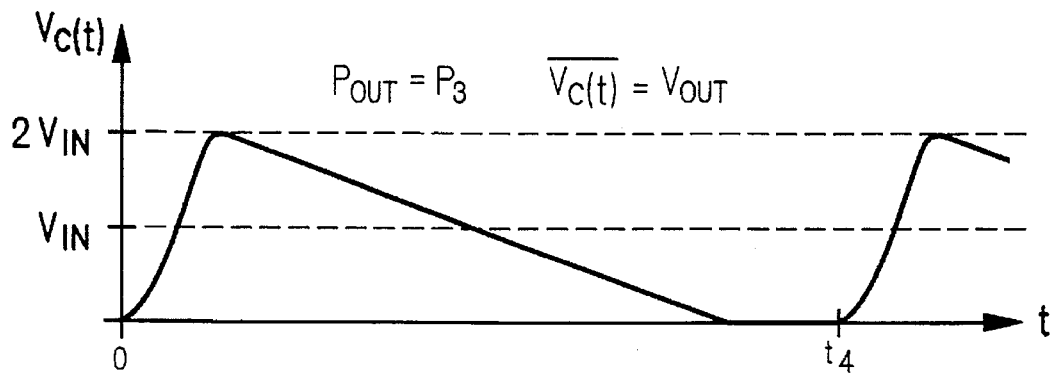

Waveforms of the capacitor voltage, Vc(t), for a prior art ZCS buck converter of the kind shown FIG. 1, operating in half-wave mode at a constant output voltage Vout, at three different values of load power, are shown in FIGS. 9A through 9C. For simplicity we assume that the value of Lo is very much larger than Lr1, so that the value of Io is essentially constant throughout an operating cycle. At maximum load, Pout=Pmax (for which Io=Ip), the converter operating period is t1, as illustrated in FIG. 9A; for a second, lower, value of load, Pout=P1<Pmax, the period is t2>t1, as shown in FIG. 9B; for third and fourth value of loads, P2 and P3, where P3<P2<P1, the periods are t3 and t4, respectively, as shown in FIGS. 9C and 9D. In all cases, assuming a lossless output filter 16, the period, and hence the operating frequency, will assume a value such that the average value of Vc(t) over the operating cycle is equal to Vout. While circuit losses in physically realizable ZCS converters will set a finite lower limit on minimum converter operating frequency, the theoretical operating frequency of an unloaded converter will be zero. There are benefits to putting a predictable lower limit on operating frequency: the output filter breakpoint frequency may be raised which mitigates toward smaller, less lossy, filter components and wider converter bandwidth; conducted and radiated EMI/RFI filters and shields become smaller; and the potential for frequency-specific interference within load circuitry can be eliminated.

Figure 10:
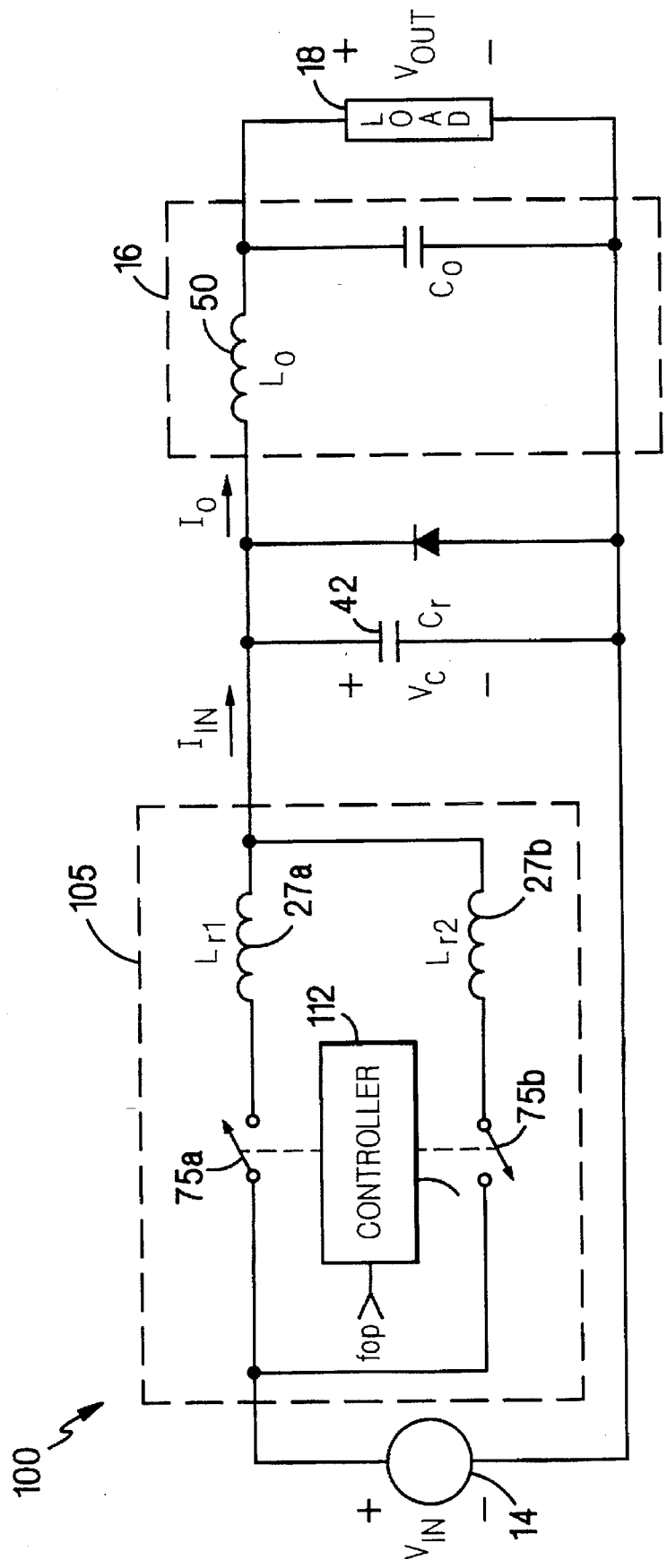
FIG. 10 shows a schematic of a ZCS buck converter according to the invention.
Figure 11A:
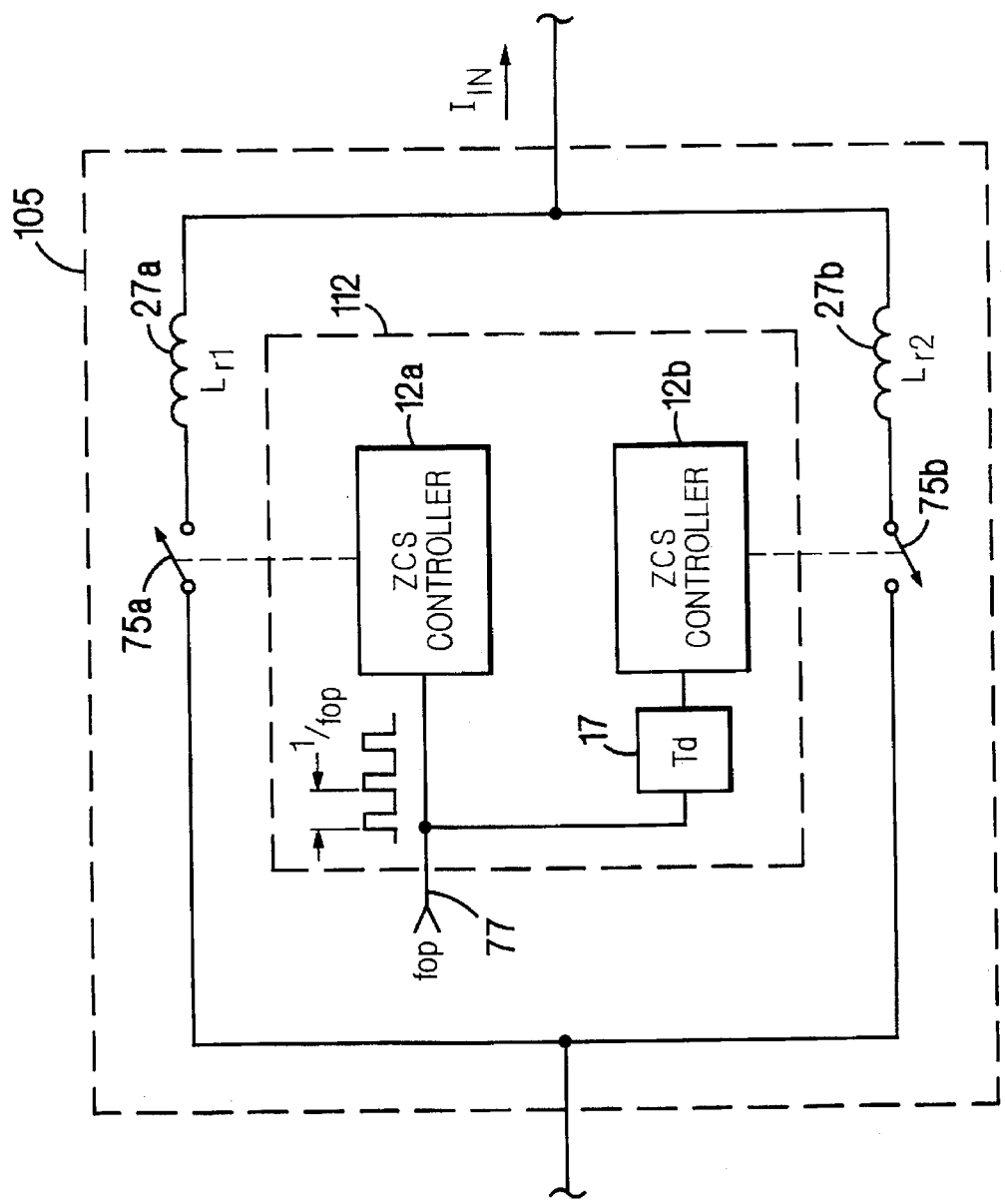
FIGS. 11A and FIGS. 11B and 11C show, respectively, a functional schematic of a multi-mode switch and two dual-mode switch controllers.

A circuit model which demonstrates the operating principle of a ZCS converter topology which provides for setting a lower limit on converter operating frequency while retaining the benefits of half-wave operation (e.g., efficiency, power sharing) at elevated loads, is illustrated in FIG. 10. In the Figure a ZCS buck converter 100 includes the same circuit elements as the prior art ZCS buck converter of FIG. 1, except that the switch 25 and the resonant inductor 27 of FIG. 1 are replaced with a "multi-mode switch" 105 in the converter of FIG. 10. The multi-mode switch consists of a first switching element 75a in series with a first resonant inductor 27a, of value Lr1, and a second switching element 75b in series with a second resonant inductor 27b, of value Lr2. The multi-mode switch 105 also includes a dual-mode switch controller 112, a simplified functional schematic of which is shown in FIG. 11A. With reference to FIGS. 10, 11A and 12, the dual-mode switch controller 105 receives a series of trigger signals 77 at a converter operating frequency fop=1/top (FIG. 12). Upon receipt of each trigger signal, the first ZCS switch controller 12a opens and closes the first switch 75a at zero current to initiate a forward flow of current, Iin (FIG. 12C), and forward transfer of energy from the input source 14 toward the capacitor 42 via the first inductor 27a. The sinusoidal variations in the currents and voltages in the converter during this forward energy transfer phase exhibit a characteristic time constant equal to T1=pi*sqrt(Lr1*Cr). This initial part of the operating cycle is seen to be essentially identical to the initial portion of an operating cycle in the prior art ZCS buck converter operating in half-wave mode (e.g., as shown in FIG. 3). However, if a new trigger signal is not received within a predetermined delay time, Td, after the initiation of forward energy transfer (where Td ends after the forward energy transfer phase has ended, e.g. at a time Td>t1 in FIG. 12), the second ZCS switch controller 12b will be triggered by the output of delay element 17 causing switch 75b to open and close at zero current, and resulting in a reverse flow of current, Iin, and a reverse flow of energy from the capacitor 42 back to the input source 14 via inductor 27b (provided that the capacitor voltage, Vc(Td) is greater than the input voltage, Vin, at time Td; if the voltage Vc(Td) is below Vin, the second switch will not be activated). The sinusoidal variations in the currents and voltages in the converter during this reverse energy transfer phase exhibit a characteristic time constant equal to T2=pi*sqrt(Lr2*Cr).

Figure 13A:
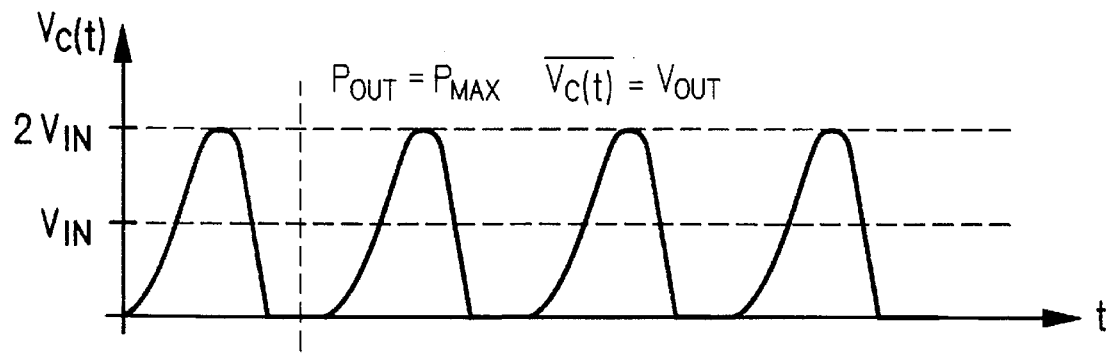
FIGS. 13A through 13D show capacitor voltage waveforms for the converter of FIG. 10 at different values of load.
Figure 13B:
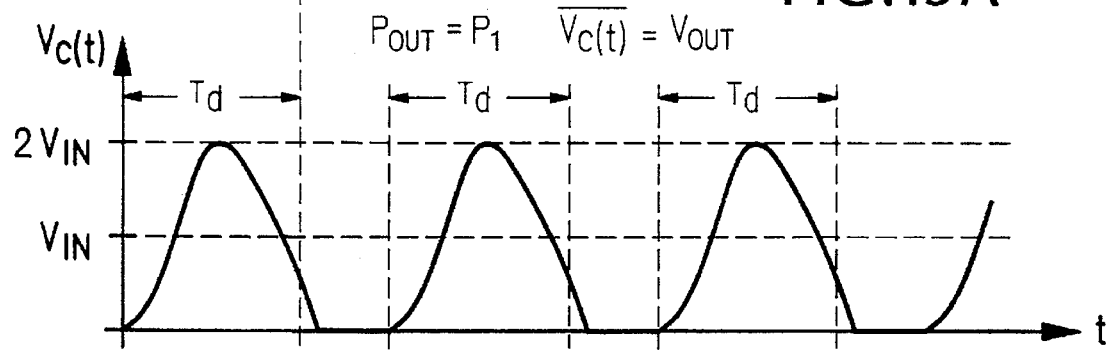
Figure 13C:
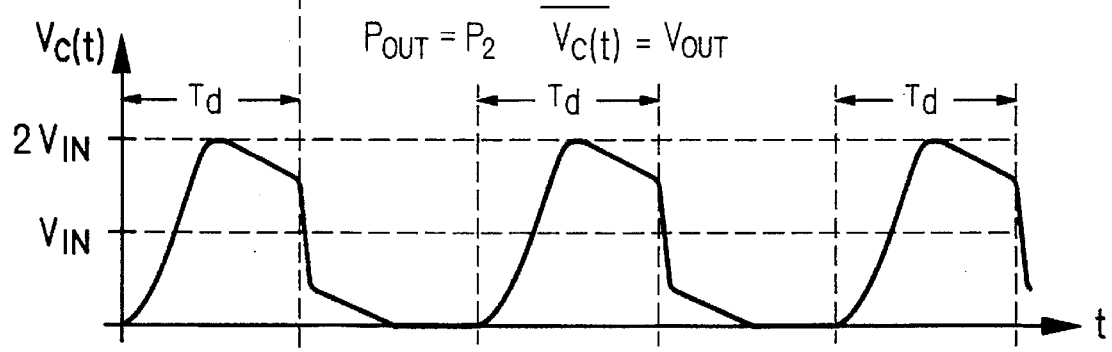
Figure 13D:
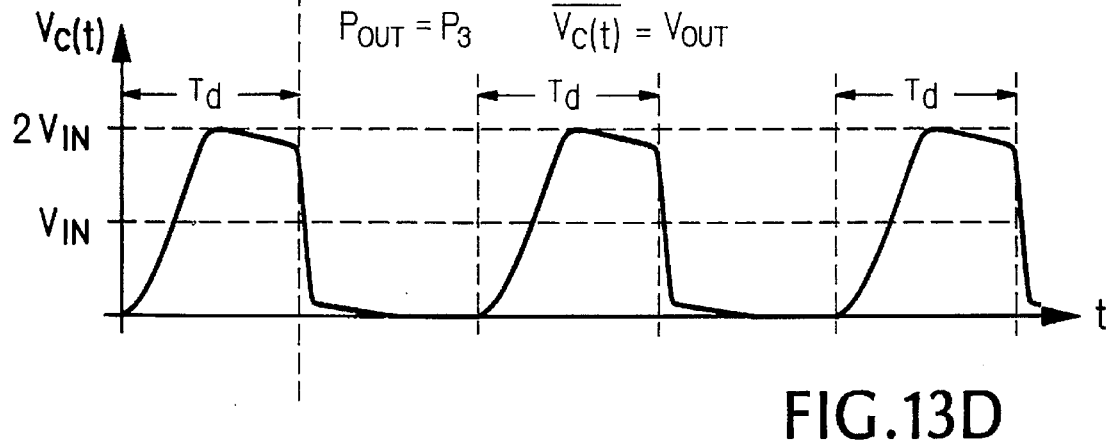

If, as illustrated in FIG. 12D, the voltage Vc(Td) is above Vin by an amount V1, then the voltage Vc will ring down in an amount 2*V1 between times Td and t2 during the reverse energy transfer phase. As load is reduced, the value of V1 will increase toward Vin and Vc(t2) will decrease toward zero. If the value of Io is assumed to be essentially constant throughout the operating cycle, then the rate-of-change of Vc(t) between times t1 and Td and between times t2 and t3 will be the same (and equal to dVc/dt=Io/Cr) and hence the two periods, Ts=Td-t1 and Ts=t3-t2, will also be the same. It is also to be noted that the total area under the voltage waveform of FIG. 12D, during the two discharge periods labeled Ts, is equal to Ts*Vpk. If we make the approximating assumption that this represents the bulk of the area under the waveform, then the area under the waveform will be essentially independent of load, as will the converter operating frequency to maintain a constant value of Vout. A comparison of FIGS. 13A through 13D, which show waveforms for Vc(t) in the converter of FIG. 10, with FIGS. 9A through 9D, which show waveforms for Vc(t) in the converter of FIG. 1, can be used to illustrate the principle. As discussed above, the waveforms of FIG. 9 illustrate that a significant reduction in operating frequency is required in a prior art ZCS converter operating in the half-wave operating mode to maintain a constant output voltage as load drops. If, however, as illustrated in FIGS. 13A through 13D, the half-wave cycle is aborted at time Td and energy stored in the capacitor 42 is returned back to the input source, then the variation in operating frequency can be substantially reduced. In FIGS. 9 and 13, the characteristic time constant for forward energy transfer, $T1 = pi.sqrt(Lr1*Cr)$, is assumed to be the same and the output power, Pout, for each corresponding waveform is also the same. The waveform in FIG. 9A is the same as that in FIG. 13A and the waveforms in FIGS. 9B and 13B are also the same, because, in both cases, Vc is below Vin at time Td; reverse energy transfer will not occur for Vc<Vin and is therefore not initiated. However, in FIGS. 13C and 13D the voltage Vc is greater than Vin at time t=Td; as a result of reverse energy flow the variation in converter operating frequency is reduced substantially compared to the prior art half-cycle converter.

As illustrated in FIG. 12 and FIGS. 13A–13D, the switch 105 will operate in different modes depending upon converter operating conditions. At conditions of elevated load (e.g., FIGS. 13A and 13B) the switch will operate only in the half-wave mode and Iin will flow only in the forward direction toward the capacitor 42. As loading is reduced, however, the switch 105 will operate in a mode such that both forward and reverse flow of Iin are caused to occur. Unlike a conventional full-wave converter, however, in which reversal of the current Iin begins immediately following the end of forward current flow (e.g., at time t=tr, FIG. 4A), reverse current flow in the present converter does not begin until a finite time has elapsed after forward current flow has ended. By providing for half-wave operation from maximum converter load down to a preselected lower value of load the efficiency and power sharing benefits of the half-wave converter can be provided at relatively high values of load, where they are of the most benefit. At lower values of load, initiation of reverse energy transfer puts a lower bound on converter operating frequency and provides for the previously described benefits.

Figure 11B:
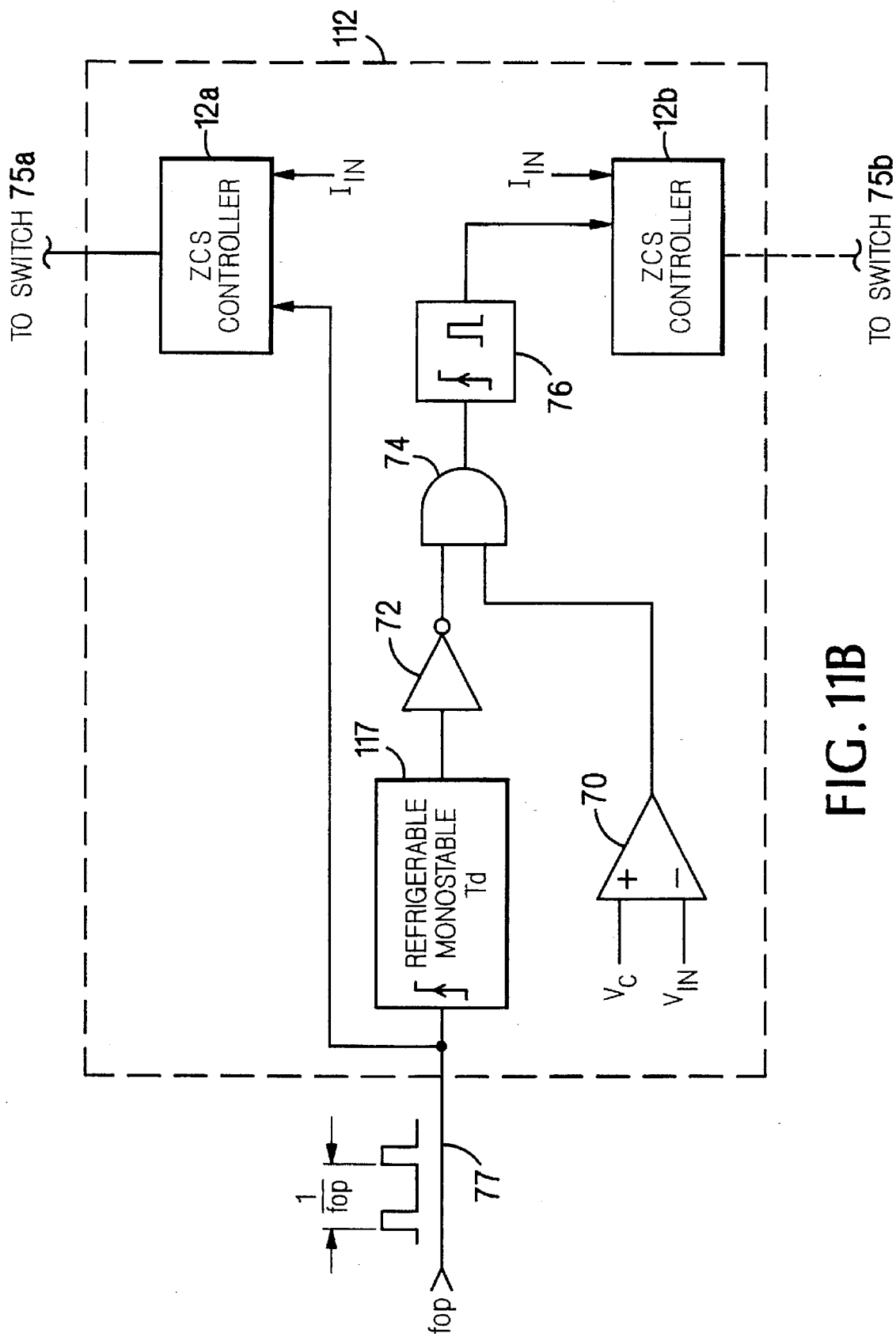

A more detailed schematic of a dual-mode controller 112, of the kind shown in FIG. 11A, is shown in FIG. 11B. In the Figure, trigger signals 77 arriving at the operating frequency fop are delivered both to first ZCS switch controller 12A and to retriggerable monostable 117. The first ZCS controller initiates forward half-wave flow of current Iin. Following each trigger signal, the retriggerable monostable 117 generates a logically high output for a time period equal to Td (and, if fop exceeds 1/Td, the output of the monostable will stay in a logically high state). Inverter 72 and AND gate 74 combine the output of the monostable 117 with the output of comparator 70 (a signal indicative of whether the capacitor voltage Vc is greater than the converter input voltage Vin). If the time period Td has elapsed and Vc>Vin, then the second monostable 76 will be triggered to produce a brief pulse for activating the second ZCS controller 126 and initiating a reverse energy transfer phase. If Vc<Vin at time Td, or if fop>1/Td, the second ZCS controller will not be activated.

Figure 14:
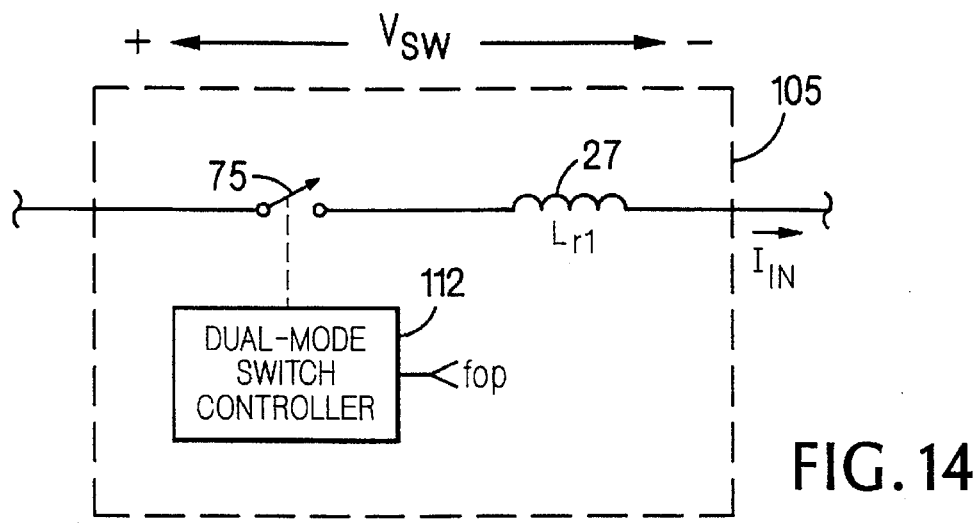
FIG. 14 shows a multi-mode switch using a single inductor.

The converter 100 and multi-mode switch 105 of FIGS. 10 and 11 provide for two distinct characteristic time constants for the forward and reverse energy transfer phases. In many applications this will not be a requirement and the multi-mode switch 105 may be simplified to the form shown in FIG. 14. In the Figure, the multi-mode switch 105 uses a single inductor 27 to provide a single characteristic time constant for both the forward and reverse energy transfer phases, and a dual-mode controller 112 for opening and closing the single ideal switch 75 (which is able to block a bipolar voltage when open and carry a bipolar current when closed) at the same times that the dual-mode controller 112 opened the two ideal switches 75a, 75b of FIG. 11.

Figure 15A:
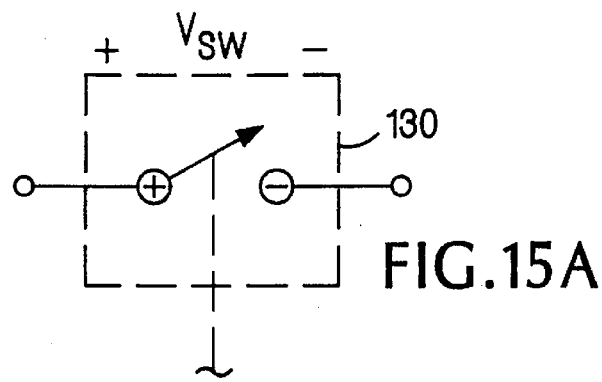
FIG. 15A and FIGS. 15B through 15E show a circuit symbol used to indicate a unidirectional switch and several embodiments of unidirectional switches, respectively.
Figure 15B:
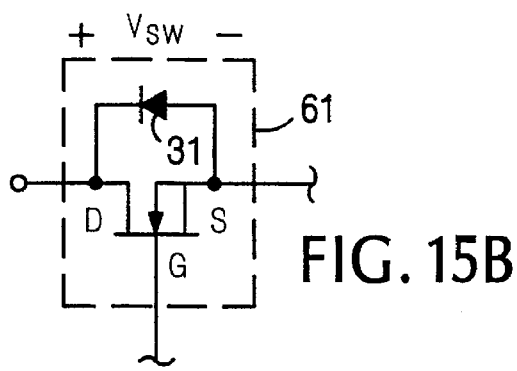
Figure 15C:
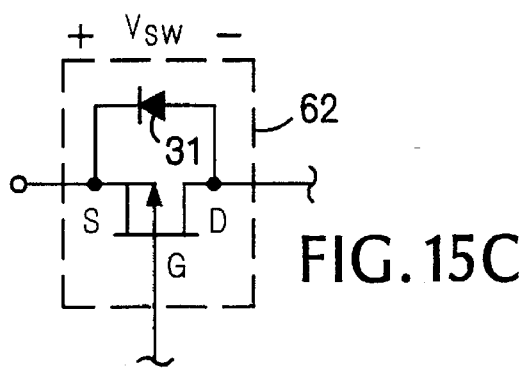
Figure 15D:
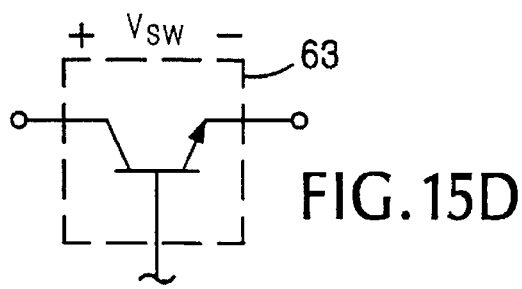
Figure 15E:
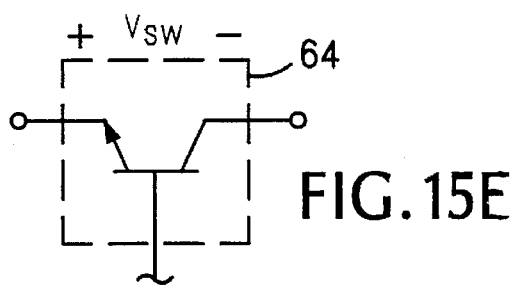

The converter and multi-mode switch of FIGS. 10 and 11 have been described and illustrated using ideal switches. In practice, non-ideal switches will be used and, as discussed earlier, application of these switches must take into account their limitations. Since a number of different types of semiconductor devices, such as bipolar and MOSFET switches, can be applied, it will be convenient to use the symbol 130 in FIG. 15A to indicate a unidirectional switch, e.g., a switch which is capable of blocking a voltage, when open, in a direction indicated by the positive and negative polarity marks included in the switch symbol, but which is either incapable, or has very limited capability of blocking a voltage of the opposite polarity. Thus, for example, the generalized unidirectional switch 130 of FIG. 15A is capable of blocking a voltage Vsw having the polarity indicated in the Figure and is therefore symbolic of the N-channel MOSFET 61 poled as shown in FIG. 15B and the P-channel MOSFET 62 poled as shown in FIG. 15C. It is also symbolic of the NPN transistor 63 poled as shown in FIG. 15D and the PNP transistor 64 poled as shown in FIG. 15C. It should be noted, however, that while the intrinsic diodes 31 inherent to MOSFETs 61, 62 make these devices virtually incapable of supporting any reverse voltage, the bipolar transistors 63, 64 can typically support a low value of reverse voltage (e.g., negative values of Vsw up to about 6.5 volts, which is typical of the reverse avalanche breakdown voltage rating of the base-emitter junction of a bipolar transistor). In general, however, the bipolar devices may be considered to be unidirectional switches.

FIGS. 16A through 16D show embodiments of multi-mode switches 105 which comprise unidirectional switches 105 (using the symbol defined in FIG. 15A). The switches of FIGS. 16A and 16C include two inductors to provide two different characteristic time constants for the forward and reverse energy transfer phases. The switches are also assumed to include a dual-mode controller, which is not shown in the Figures. Like the switch 125 in the half-wave prior art converter 30 of FIG. 5B, the composite switch configurations of FIG. 16 suffer the efficiency penalty, previously described, inherent to the presence of a series diode in the forward current path (e.g., diode 38a, FIG. 16A and diode 134b, FIG. 16D). The switch configurations of FIGS. 16A and 16C use two inductors 27a, 27b to provide two different characteristic time constants for the forward and reverse flow of current; the switch configurations of FIGS. 16B and 16D include a single inductor 27 to provide a single characteristic time constant.

Figure 17:
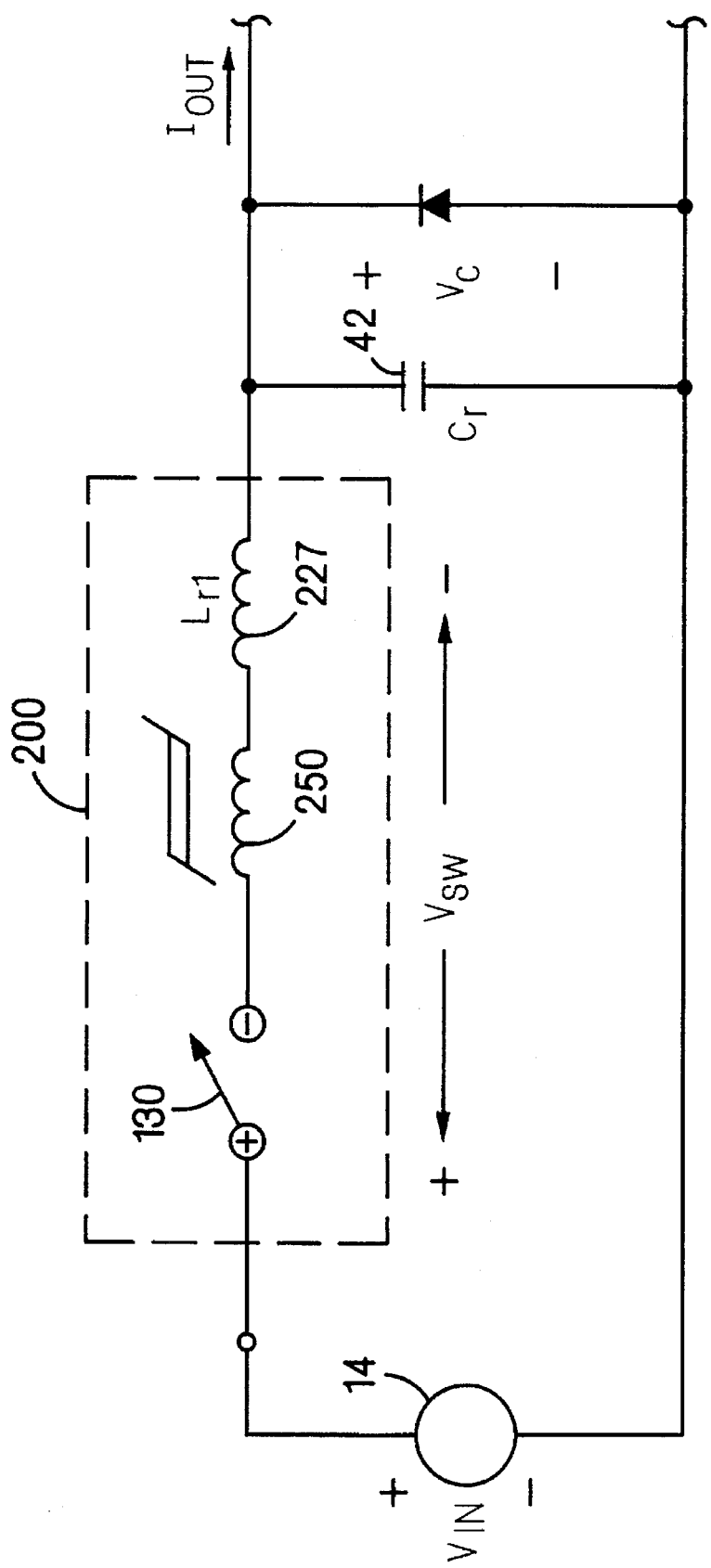
FIG. 17 shows a portion of a ZCS converter which includes a multi-mode switch comprising a saturable inductor.

A functional schematic of a multi-mode switch which overcomes the efficiency penalty associated with use of a series blocking diode is illustrated in FIG. 17. The multi-mode switch 200 consists of a unidirectional switch 130 in series with both a saturable inductor 250 and a linear inductor 227 of value Lr1 (a "linear inductor" has an inductance value which is fixed and independent of the value of Iin over the expected range of variation of Iin); the saturable inductor has a saturated inductance, Lsat, which is much smaller than Lr1 and an unsaturated inductance, Lunsat, which is much greater than Lr1. For a bipolar symmetrical excitation, the series combination of the saturable inductor 250 and the linear inductor 227 might have a composite magnetization curve of the kind shown in FIG. 18. In the Figure, if the core is initially unenergized (e.g., in FIG. 18, at the point marked "a" ) a positive flow of current Iin will bias the core along the path indicated by the arrow 212. This is a region in which the saturable inductor is saturated in the forward direction and the composite inductance is essentially equal to Lr1. As current is reduced (e.g., along paths 214 and 216), however, the saturable inductor will come out of saturation and the composite inductance will increase to a value essentially equal to Lunsat. As indicated in the Figure, the slope of the magnetization curve is indicative of the composite inductance. The "volt-second rating" of the saturable inductor is the total volt-seconds which the inductor can support while in its unsaturated state (e.g., the time integral of the inductor voltage, Vsat, required to cause the flux to change from forward saturation (e.g., point "c", FIG. 18) to reverse saturation (e.g., point "d", FIG. 18) along a path like that of path 219 in the magnetization curve of FIG. 18). The current levels at which the saturable inductor makes transitions between its saturated and unsaturated states are assumed to be small relative to the peak value of Iin which flows during a forward energy transfer cycle.

Figure 18:
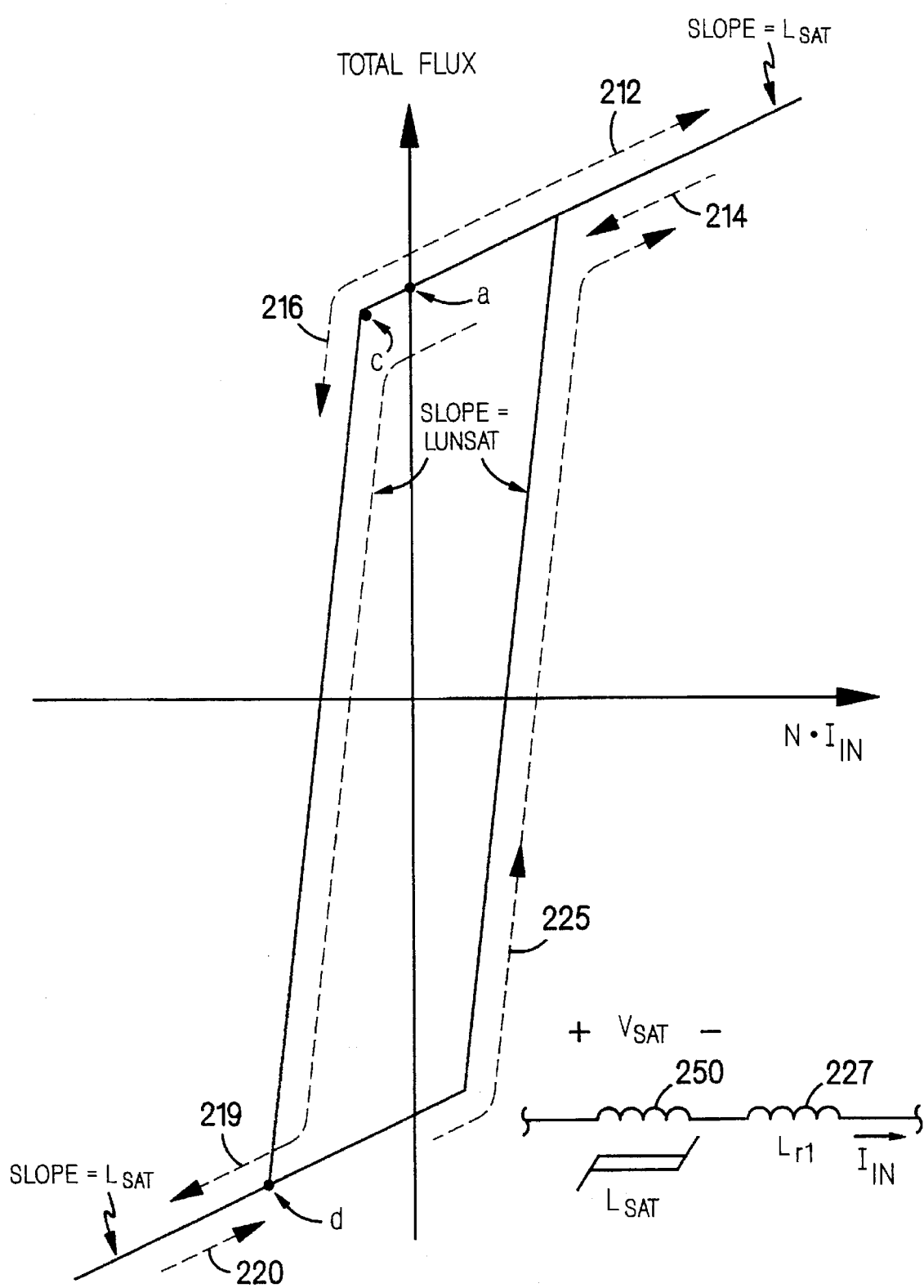
FIG. 18 shows a magnetization characteristic of a saturable inductor.
Figure 19A:
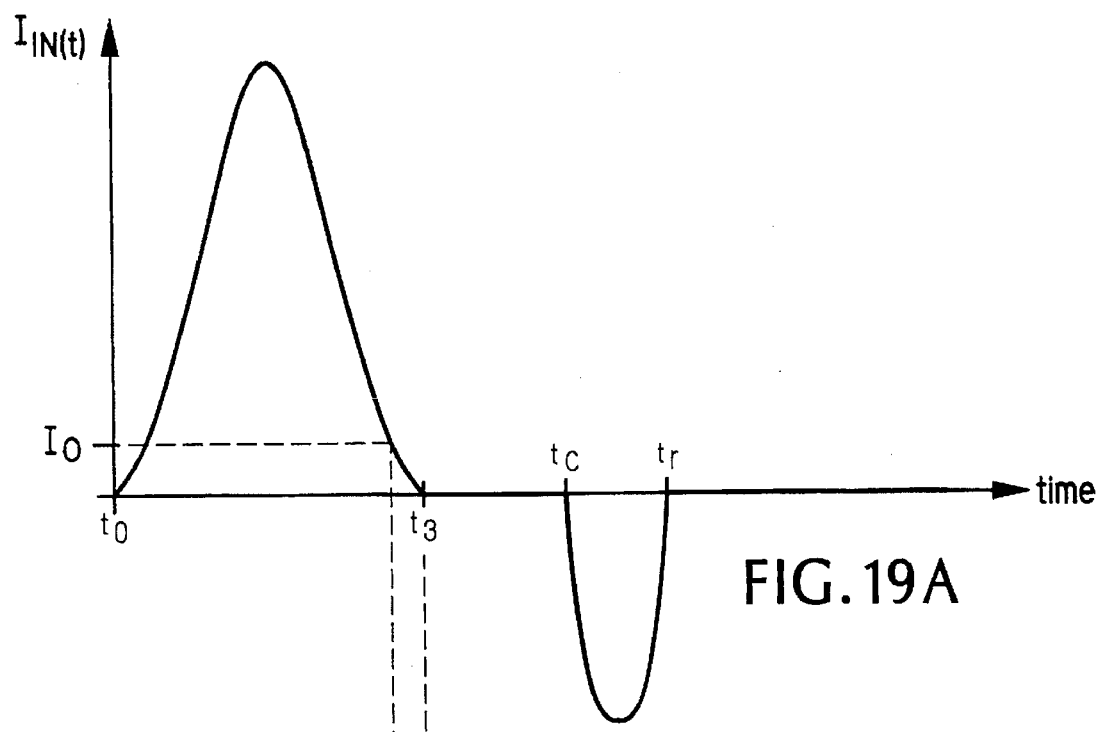
FIGS. 19A and 19B show waveforms for the converter of FIG. 17.
Figure 19B:
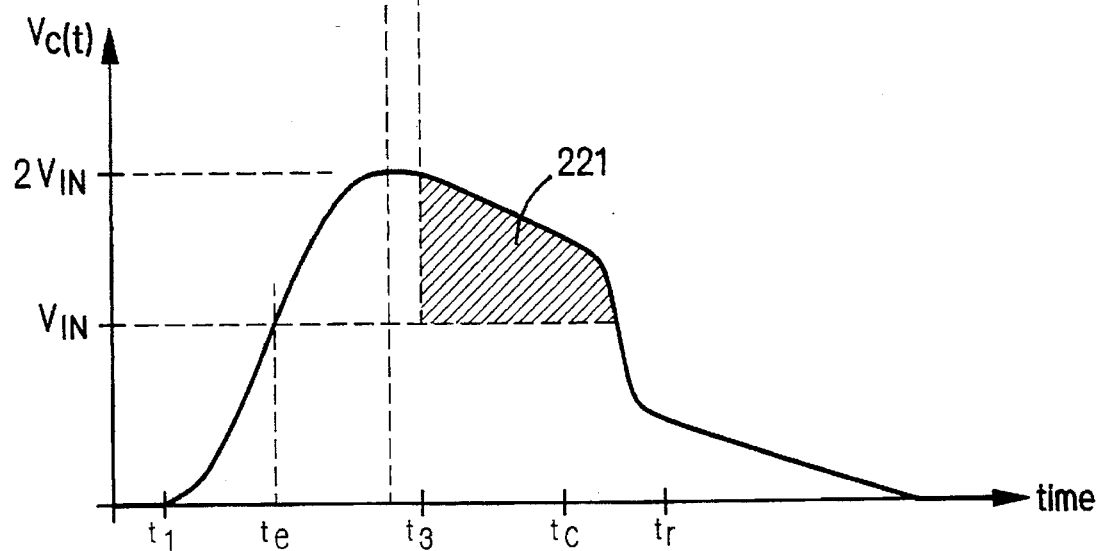

The operating principle of the multi-mode switch 200 of FIG. 17 is explained with reference to FIGS. 17 and 18 and the waveforms of FIGS. 19. At time t=t0, the unidirectional switch 130 is turned on (at zero current) with the saturable inductor 250 initially in a saturated state (e.g., at a point like point "a" 210 in FIG. 18). As indicated in FIG. 19A, there will be an initial half-wave flow of current, Iin, between times to and t3. Between times te and tx, the voltage Vc(t) (FIG. 19B) will be above Vin, inducing a reversal of the flow of Iin back toward the source (the unidirectional switch 130 being incapable of blocking the reverse flow). This will bias the saturable inductor 250 into an unsaturated state (e.g., along a path like path 216, FIG. 18) causing the composite inductance to rise sharply (e.g., to a value Lunsat). Because of the relatively high impedance presented by Lunsat, both the reverse current which flows after time t3, and the amount of energy returned back to the input source 14, will be very small. Between times t3 and tc, the saturable inductor 250 performs the function performed by the series diode 38 in a prior art half-wave ZCS converter, supporting Vsw and preventing substantial reverse current from flowing during the time that Vsw is negative. At time t=tc, however, the volt-seconds supported by the saturable inductor (e.g., as represented by the shaded area 221 under the waveform for Vc(t) in FIG. 20B) exceeds the inductor's volt-second rating; the saturable inductor becomes reverse saturated, the composite inductance drops back to Lr1, and a reverse flow of Iin between time tc and tr transfers a portion of the energy stored in the capacitor 42 back toward the input source 18. Here the magnetization curve would be traversed along a path like that of 219 in FIG. 18, returning back to zero current (e.g., to point "e", FIG. 18) along a path like that of path 220. As discussed below, the saturable inductor must be reset to forward saturation to initiate another forward energy transfer cycle.

Figure 20A:
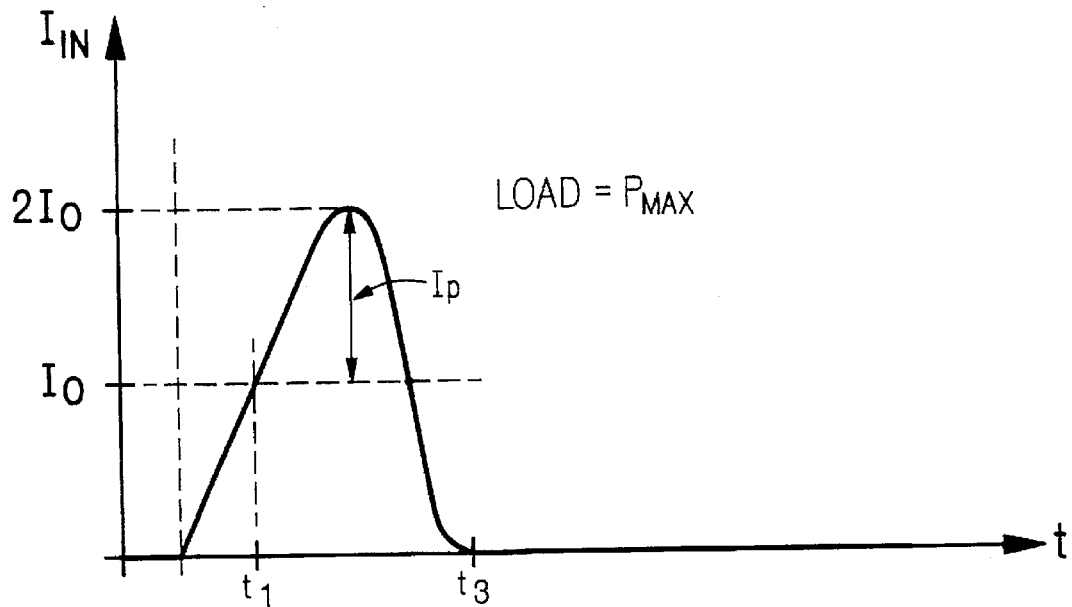
FIGS. 20A through 20D show waveforms for the converter of FIG. 17 at different values of load.
Figure 20B:
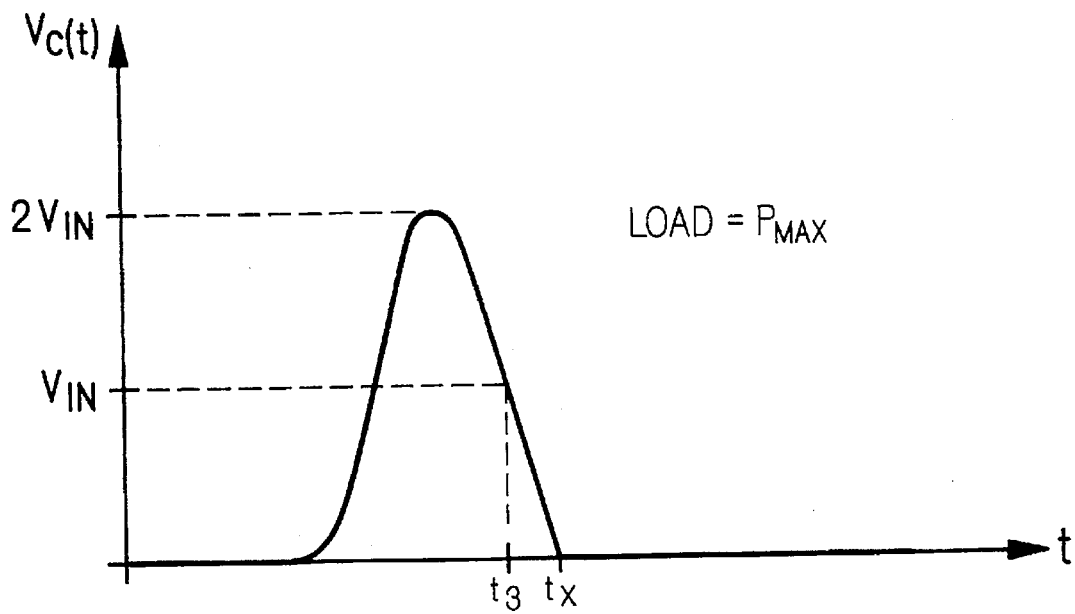
Figure 20C:
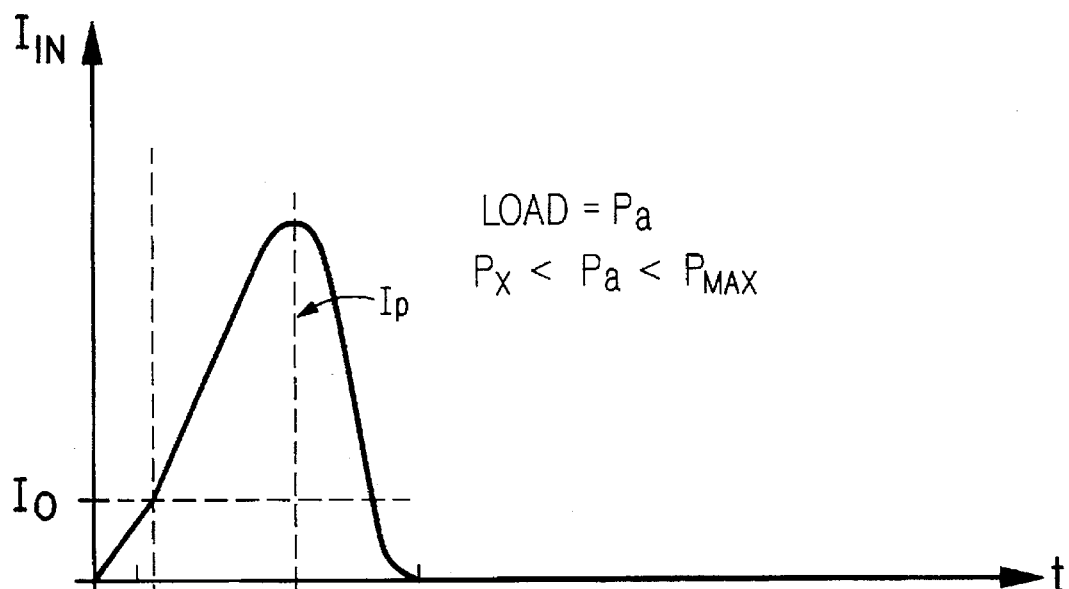
Figure 20D:
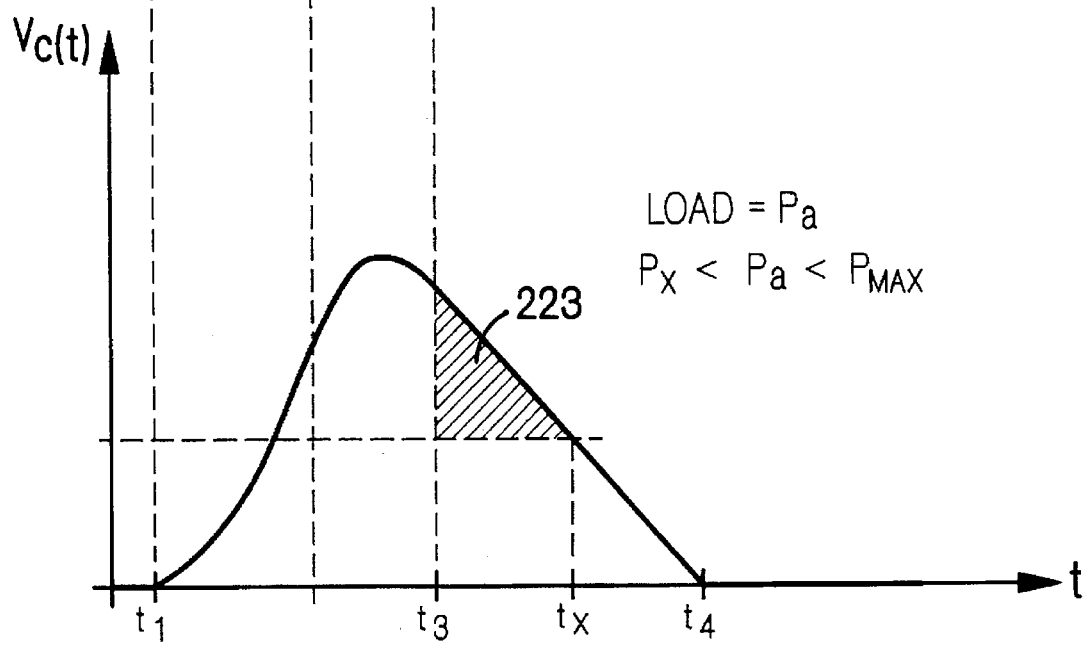

As load is increased, the rate of decline of Vc(t) will increase and, above some value of load power, Px, the net volt-seconds applied to the inductor while Vc is above Vin will no longer be sufficient to bring the inductor into reverse saturation. For example, as illustrated in FIGS. 20A and 20B, if the converter is operating at its maximum allowable load (e.g., at a load Pmax, for which Io=Ip), the current Iin will return to zero at the same instant that Vc has declined to a value Vin. For this operating condition the saturable inductor is not called upon to support any reverse voltage between times t3 and tx; the saturable inductor will remain in forward saturation (e.g., at point "a", FIG. 18) and will not have to be reset prior to initiation of another forward energy transfer cycle. On the other hand, as illustrated in FIGS. 20C and 20D, as load declines from Pmax toward Px the saturable inductor will be called upon to support reverse voltage for an increasing period of time, tx—t3, as indicated by the cross-hatched area 223. In general, as load is decreased from Pmax toward Px, the volt-seconds required to reset the core back to forward saturation will increase.

Figure 21A:
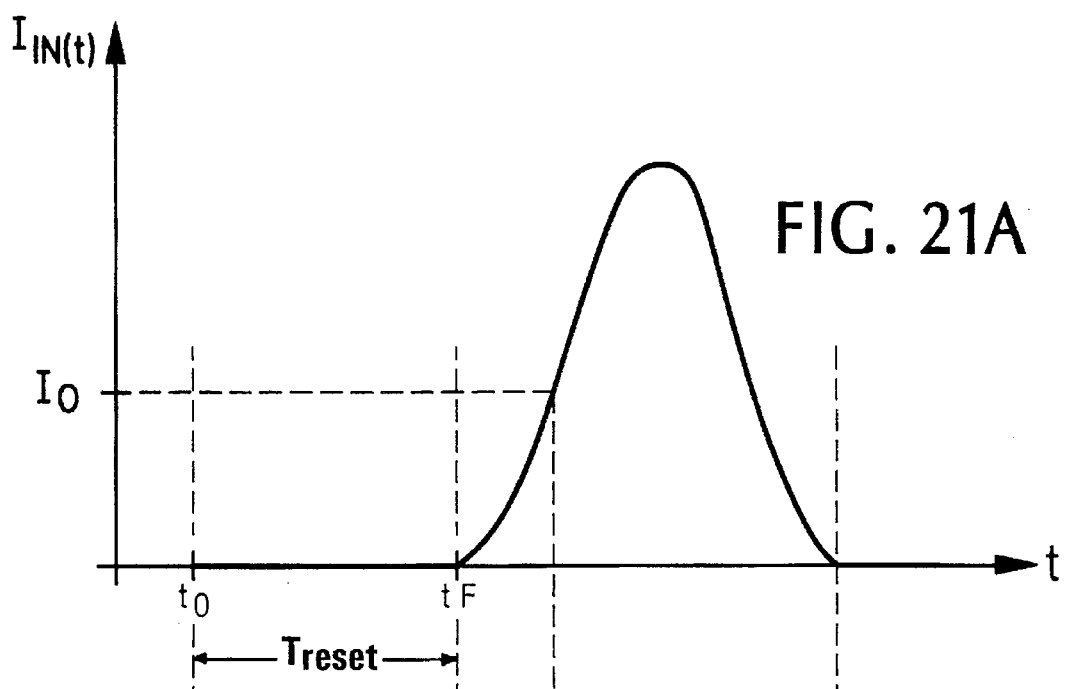
FIGS. 21A and 21B show additional operating waveforms for the converter of FIG. 17.
Figure 21B:
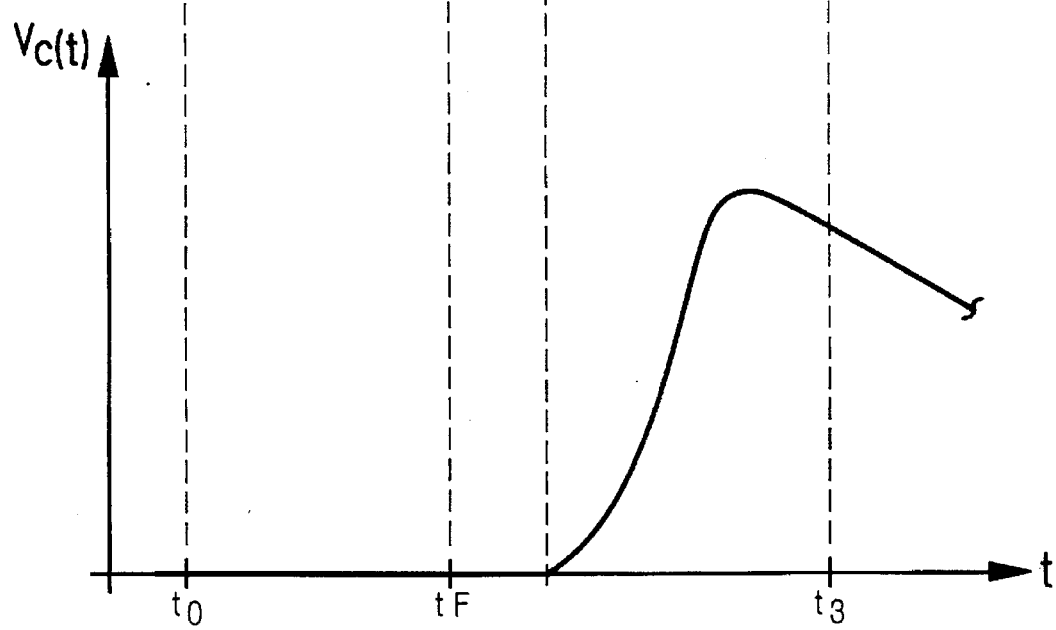
Figure 22A:
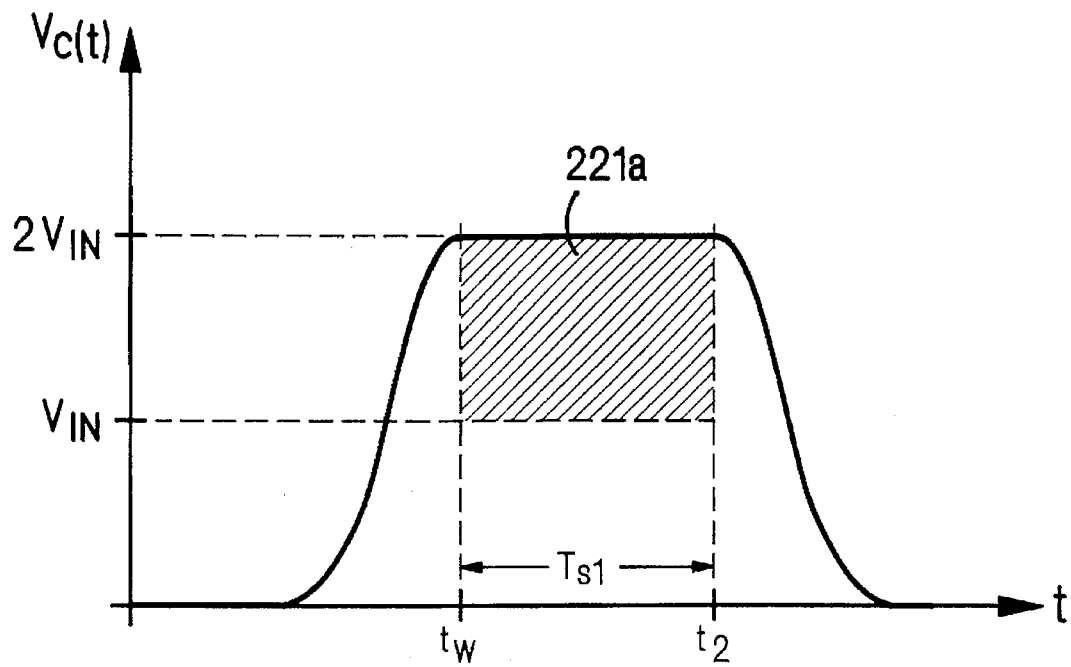
FIGS. 22A and 22B show capacitor voltage waveforms for the converter of FIG. 17 at different values of load.
Figure 22B:
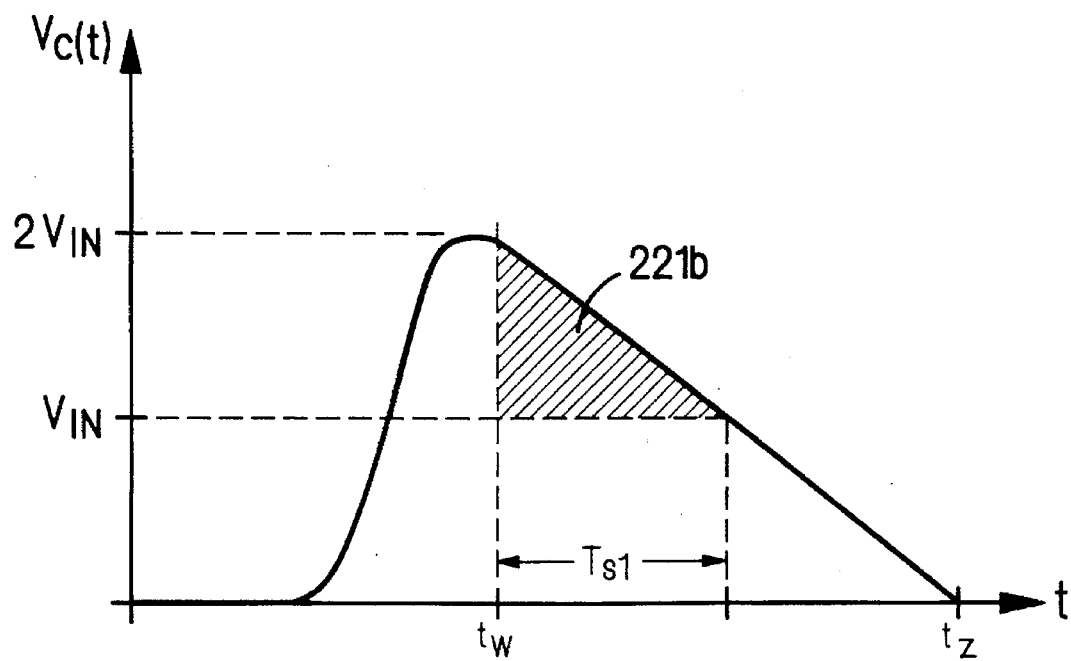

One way to reset the saturable inductor to forward saturation is to simply turn on the unidirectional switch 130. Assume, for example, that the saturable inductor is in reverse saturation and that a new operating cycle is started. Closure of the switch 130 (FIG. 17) will result in application of Vin across the composite inductor; the saturable inductor 250 will become unsaturated as it begins to traverse a path like that of path 225 in FIG. 18 and, as shown in FIG. 21A, the application of Vin across the unsaturated inductor will result in a small positive flow of current Iin between times to and tf. The volt-seconds associated with the application of Vin across the saturable inductor will result in the inductor going into forward saturation at time t=tf and initiation of a half-wave forward flow of current between times tf and t3. The rest of the operating cycle will be as described earlier. Using Vin to reset the saturable inductor to forward saturation at the beginning of each operating cycle effectively results in a delay in the initiation in forward energy transfer and a concomitant increase the length of each cycle. To estimate the relative size of this delay, we again note that the volt-second rating of the saturable inductor is indicated by the area under the Vc(t) waveform between times t=t3 and t=tc. This area is illustrated for two different values of converter load in FIGS. 22A and 22B. In FIG. 22A the converter is at zero load: Vc rings up to 2*Vin and remains there until the saturable inductor saturates. If the saturable inductor has a volt-second rating equal to VS, then the time period Ts1 will be Ts1=VS/Vin. In FIG. 22B, all other converter parameters remain the same except that the load is reduced to Px, the maximum value of load at which reverse saturation will still occur (e.g., the saturable inductor will saturate at the exact time that the voltage Vc has discharged to a value Vin). The time period Ts2 in FIG. 22B will be twice Ts1, since the volt-seconds associated with each of the areas 221a, 223b, and hence the two areas themselves, must be the same. Thus, the value of Ts will vary over an approximately 2 to 1 range as converter load is increased from no-load to Px. However, resetting of the saturable inductor back to positive saturation always occurs at a constant value of voltage, Vin, so the delay time, Treset (FIG. 21) will be approximately equal to Treset=VS/Vin. Therefore, the delay time Treset will be comparable in magnitude to Ts1 (and approximately one-half of the magnitude of Ts2). As load is increased above Px, and the volt-seconds required to reset the core decreases, the delay time Treset will decline toward zero.

Other ways to reset the saturable inductor, which will also reduce or eliminate the delay time of FIG. 22, are illustrated in FIG. 23A and 23B. In FIG. 23A, for example, the multi-mode switch of FIG. 17 is modified by the addition of a diode 238. Use of this diode is generally beneficial as it will help control voltages and current flows when the unidirectional switch 130 is turned off. For example, if the switch 130 is turned off when a small positive current Iin is flowing, the diode 238 will provide a path for the flow of the current and clamp the voltage Vs at ground, thereby providing path for the flow of Iin toward the capacitor 42 and protecting the switch 130 from exposure to uncontrolled negative transient voltages. However, if the diode is also sized to exhibit a lower voltage drop than the catch diode 46, then a portion of the current Iout can flow in the diode and the inductors 250, 227 at the end of each operating cycle and this flow of current will tend to reset the saturable inductor 250 to forward saturation. In FIG. 23B a resistor 237 and a diode 240 are connected from the converter output back to the saturable inductor 250 such that current, Ix, can flow from the output and through the inductor 250 in a direction which resets the inductor to forward saturation during the latter portion of the operating cycle when the voltage Vc is below Vout.

Figure 24:
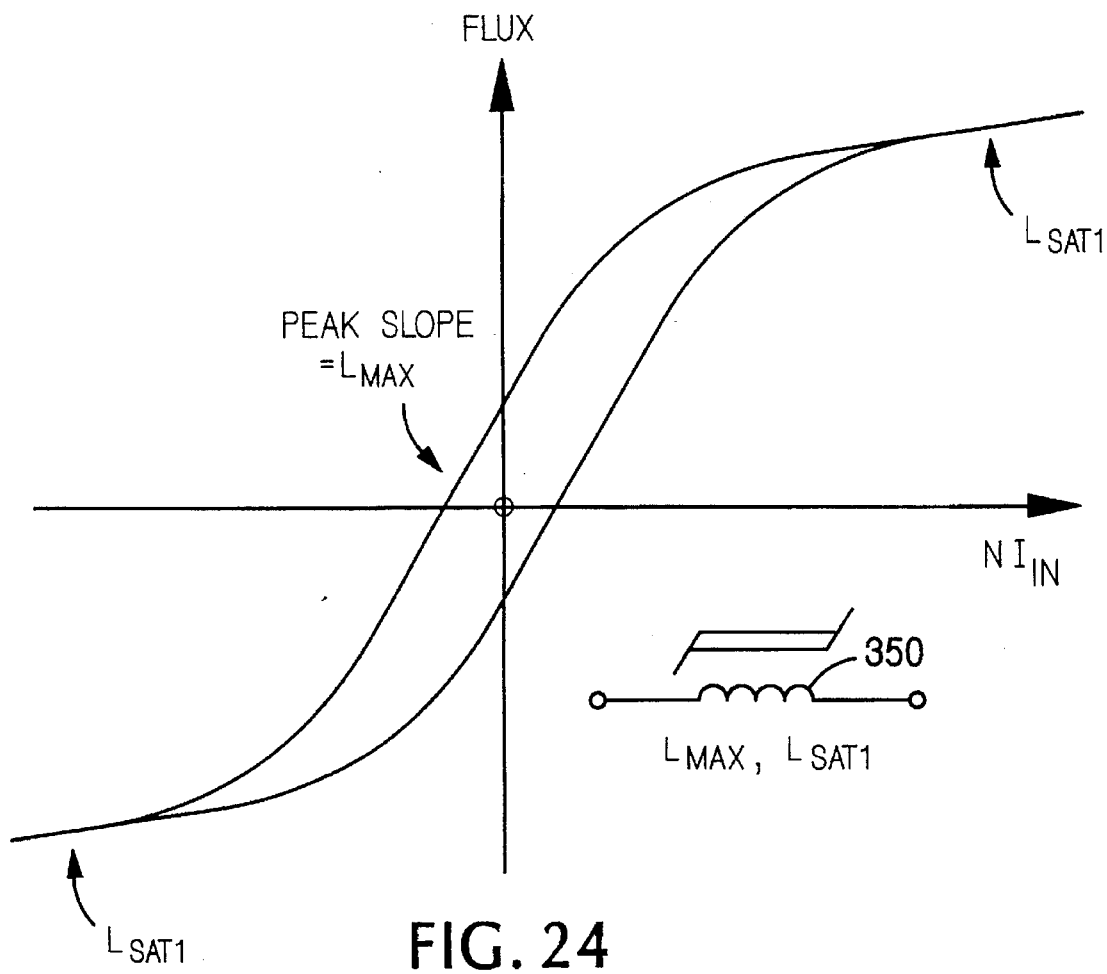
FIG. 24 shows another magnetization characteristic of a saturable inductor.
Figure 25:
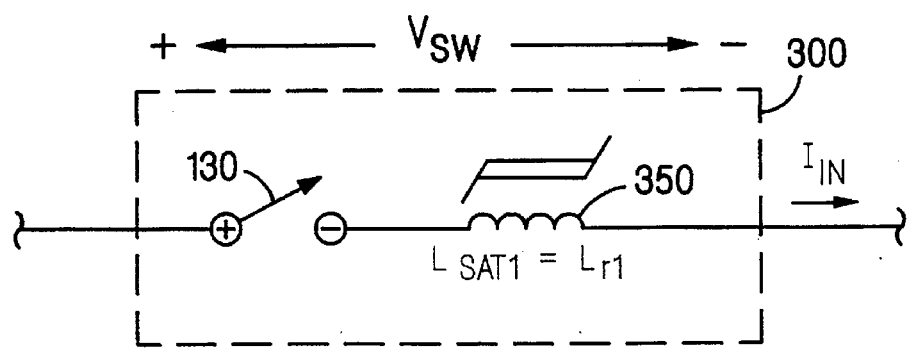
FIG. 25 shows another embodiment of a multi-mode switch comprising a saturable inductor.

The operation of the multi-mode switch 200 of FIG. 17 was explained with reference to the magnetization characteristic of FIG. 18. This was done for purposes of illustration, but it is understood that the principle of operation of the switch is not dependent on a specific magnetization characteristic but rather on the impedance variation afforded by the reversion of the saturable inductor between its saturated and unsaturated states. In practice, saturable inductors having a variety of characteristics may be used. For example, FIG. 24 shows a magnetization characteristic for a saturable inductor 350 which exhibits a saturated inductance, Lsat1, and a relatively smooth increase in inductance as current declines toward zero. The use of distinct saturable and linear inductors 250, 227 in the switch 200 of FIG. 17 is also illustrative. A single inductor may also be implemented which has a relatively high unsaturated inductance but which is constructed to exhibit a predetermined saturated inductance corresponding to the desired value of Lr1. For example, the multi-mode switch 300 of FIG. 25 consists of a unidirectional switch 130 in series with a saturable inductor 350 having a magnetization characteristic like that of FIG. 24 for which, as indicated in FIG. 25, the value of Lsat1 is approximately equal to a value Lr1, where Lr1 is significantly lower than the unsaturated inductance. The switch 300 may be applied in the same manner as the switch 200 of FIG. 17.

Figure 5A:
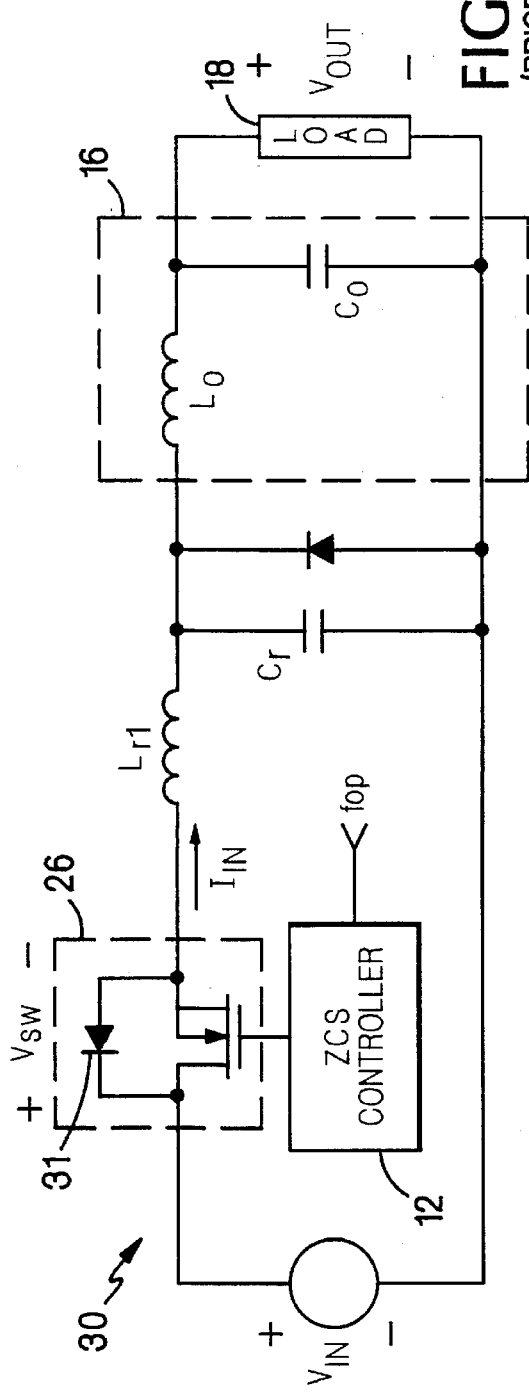
FIGS. 5A and 5B show prior art embodiments of ZCS buck converters, using MOSFET semiconductor switches, adapted for operation in the full-wave and half-wave modes of operation, respectively.
Figure 5B:
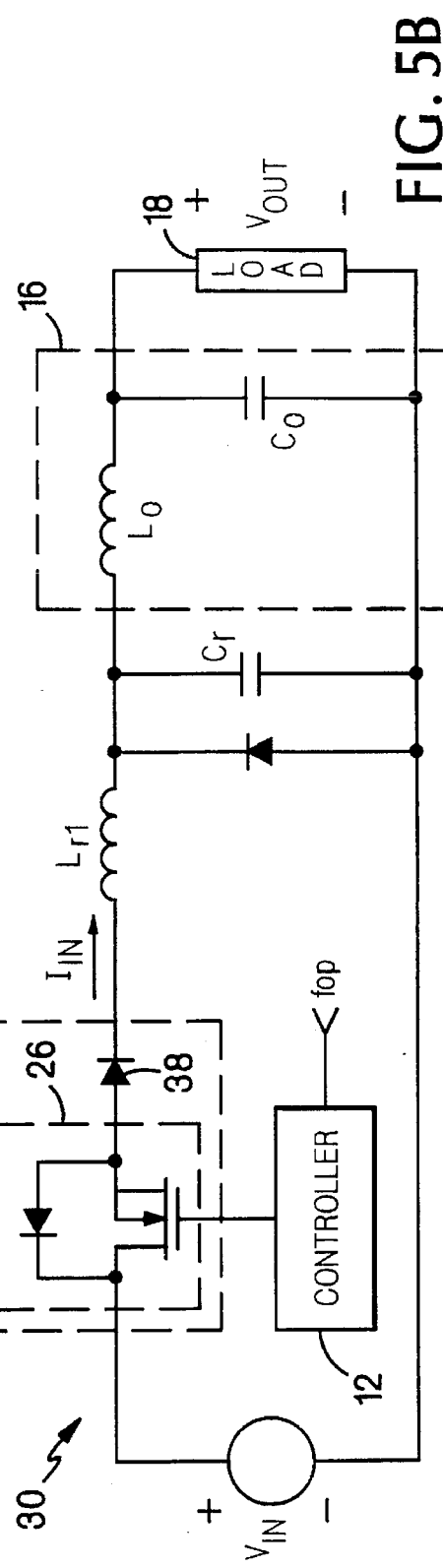
Figure 6A:
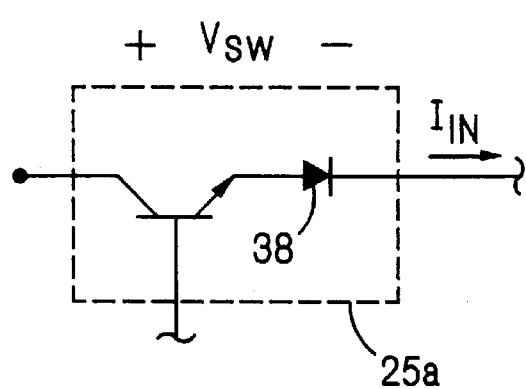
FIGS. 6A and 6B show composite switches comprising bipolar transistors.
Figure 6B:
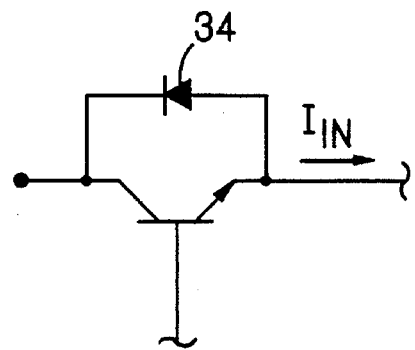
Figure 7:
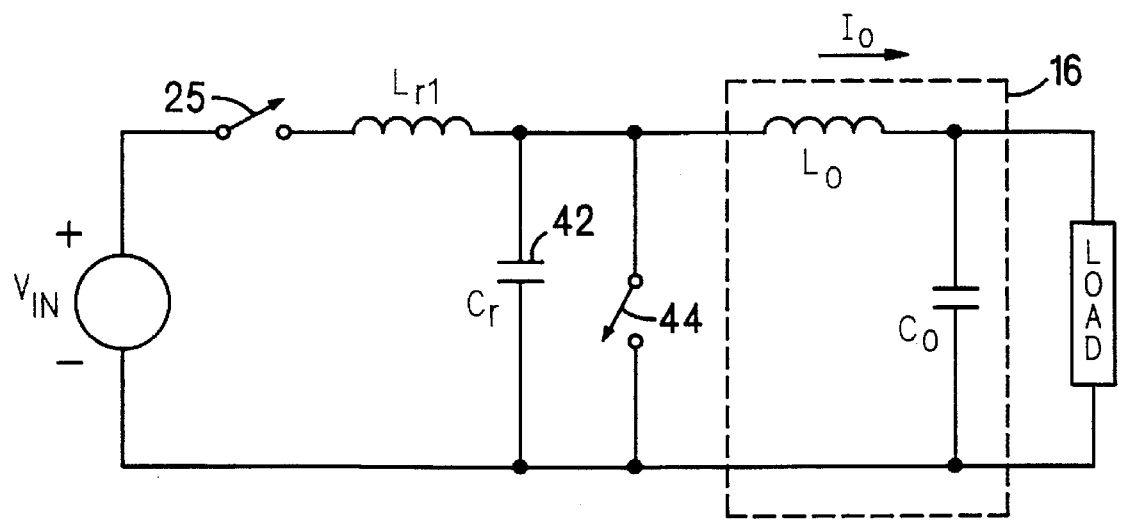
FIG. 7 shows a ZCS converter which incorporates a second switch which can be used to limit the minimum operating frequency of the converter.
Figure 8:
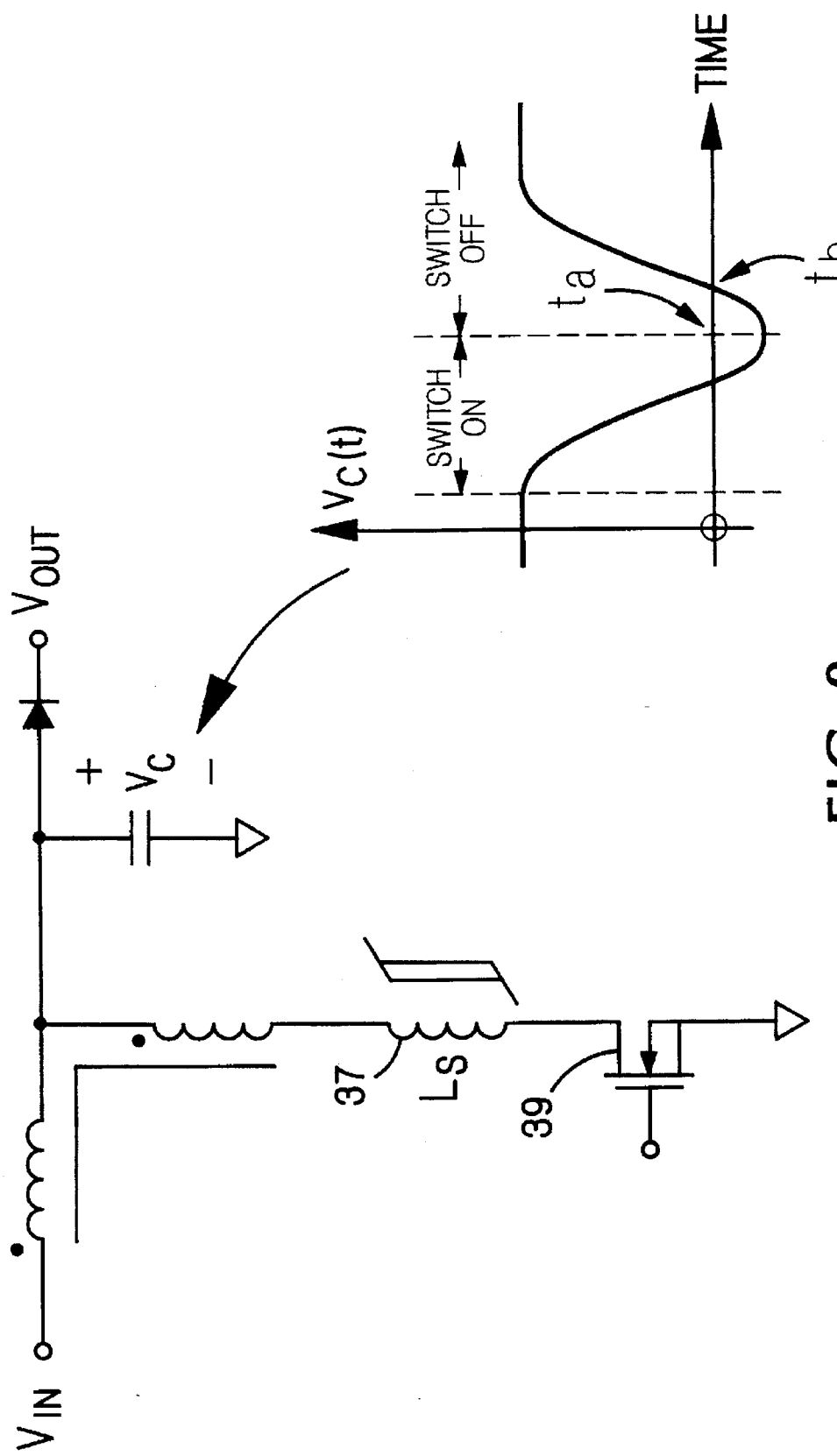
FIG. 8 shows a prior art ZCS boost converter which includes a saturable inductor in series with the switch.

A benefit of the multi-mode switch topology 200 of FIG. 17 is that the saturable inductor 250 provides reverse blocking with significantly less circuit loss than a series diode. For example, in a non-isolated ZCS buck converter operating in half-wave mode, at an input voltage of 5 volts, a load voltage of 3.3 volts and at an average load current of 13 Amperes, a series Schottky blocking diode (used, as shown in FIG. 5B, in conjunction with an N-channel MOSFET unidirectional switch 26) having a relatively low voltage drop of approximately 0.45 volt exhibits a loss of nearly 6 watts. In an equivalent converter using a saturable inductor, however, the inductor loss is less than 1 Watt—a reduction in overall loss of more than 5 Watts. Another benefit is that the performance of the ZCS switch controller can be relaxed. While the performance of the "ideal" converter of FIG. 1 will depend upon the degree to which the timing of the turn-off of the switch coincides with the instant in time at which the current crosses zero, the accuracy of switch timing in converters which include series elements for blocking reverse current flow (such as prior art converters using switches of the kind shown in FIGS. 5B, 6B, or converters according to the present invention using switches of the kind shown in FIG. 16 or 17) is much less important. In a prior art half-wave converter (e.g., FIG. 5B) the switch can be turned off at any time between the first zero crossing of current and the time at which the voltage Vc declines to a value Vin. If this timing condition is met, the diode 38 will block reverse current flow and the requirements for zero-current switching will be met. In the switch of FIG. 17 a similar strategy can be used: the unidirectional switch can be turned off at any time after the initial half-wave forward flow of current is complete but before the saturable inductor saturates. This is relatively easy to accomplish, since, with reference to FIG. 3, the time period between times t1 to t3 is bounded to be between Tmin=pi,sqrt(Lr1,C) and Tmax=1.5,pi,sqrt(Lr1*C). Thus, one simple way to control the switch would be to sense the beginning of the rise in Vc(t) after the switch is turned-on and then turn the switch off after a fixed time delay thereafter, the delay being equal, for example, to slightly more than Tmax. Similar comments apply to switch turn-off following an interval of reverse current flow. In either case, the inherent current limiting property of the saturable inductor allows for simplification of the switch controller.

Another benefit of the use of a saturable inductor in a multi-mode switch is that the minimum converter operating frequency is bounded within a range as both load and the input source voltage vary. With reference to FIGS. 22A and 22B, if we make the simplifying assumption that the majority of the area under each waveform occurs during the non-resonant portion (e.g., between times tw and tz in each Figure) then the area under the waveform of FIG. 22A is approximately VSa=2*Vin*Ts1 and the area under the waveform of FIG. 22B is approximately VSb=2,Vin*Ts2= 2,VSa (since, as discussed earlier, Ts2 is approximately 2*Ts1). As also noted earlier, however, Vin*Ts1 is set by the volt-second rating of the saturable inductor so the total area under the waveform will only vary over an approximately 2:1 range as the load and input voltage vary. Since the converter output voltage is equal to the average value of Vc(t) (assuming no losses in the output filter inductor), and since the average value of Vc(t) is equal to Vout=AREA UNDER Vc(t)/OPERATING PERIOD =fop*AREA, then the operating frequency will also vary only over a 2:1 range.

Figure 11C:
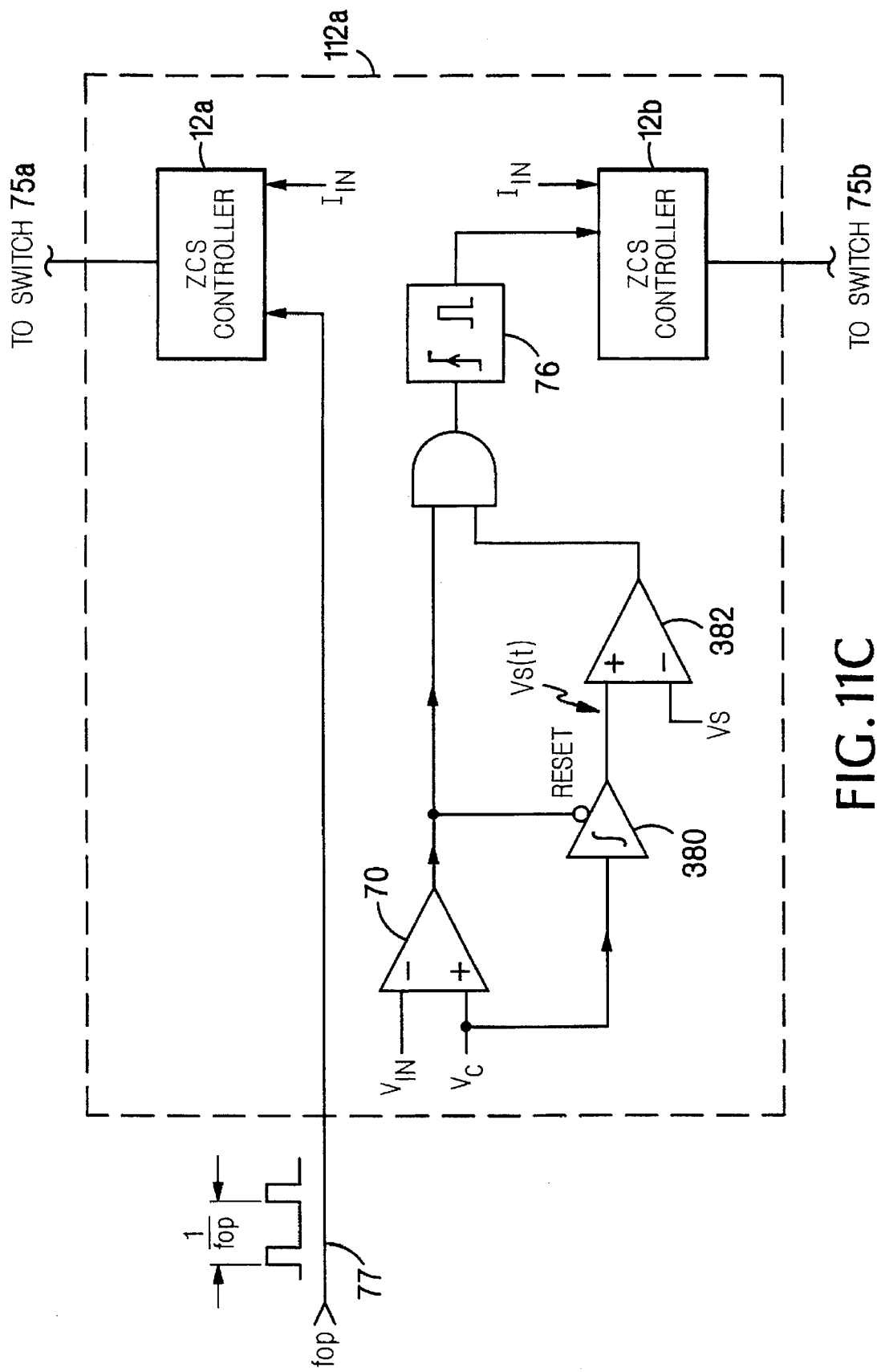

The simple dual-mode controller 112 illustrated in FIGS. 11A and 11B does not provide the bounded variation in lower frequency limit afforded by the use of a saturable inductor. Because the controller of FIG. 11 incorporates a fixed delay time (e.g., delay time Td, FIG. 12D), a converter using such a controller will exhibit a range of variation of operating frequency which is also dependent upon input voltage. As a result, the total range of variation will be approximately two times the anticipated variation in the value of Vin. However, a dual-mode controller can be arranged in a virtually infinite number of ways to provide for some desired behavior in converter minimum operating frequency. For example, the dual-mode controller 112a of FIG. 11C is arranged to emulate an ideal saturable inductor when used in a multi-mode switch of the kind shown in FIG. 11A. In FIG. 11C, each incoming trigger pulse 77 initiates a half-wave forward transfer phase via ZCS controller 12a. As Vc(t) rings up above Vin, the integrator is enabled and begins to deliver an output, VS(t), proportional to the time integral of Vc(t). If Vc(t) remains above Vin for a period of time sufficient for VS(t) to exceed some predetermined value, VS (equivalent to a volt-second rating), then the output of comparator 382 will go high, triggering monostable 76 and beginning a reverse energy transfer phase via ZCS controller 12b. If, however, the load is sufficiently high so that Vc(t) drops below Vin prior to VS(t) becoming greater than VS, then the output of comparator 70 will go low, the integrator 380 will be disabled and its output reset to zero, and the reverse energy transfer phase will not occur.

Figure 26A:
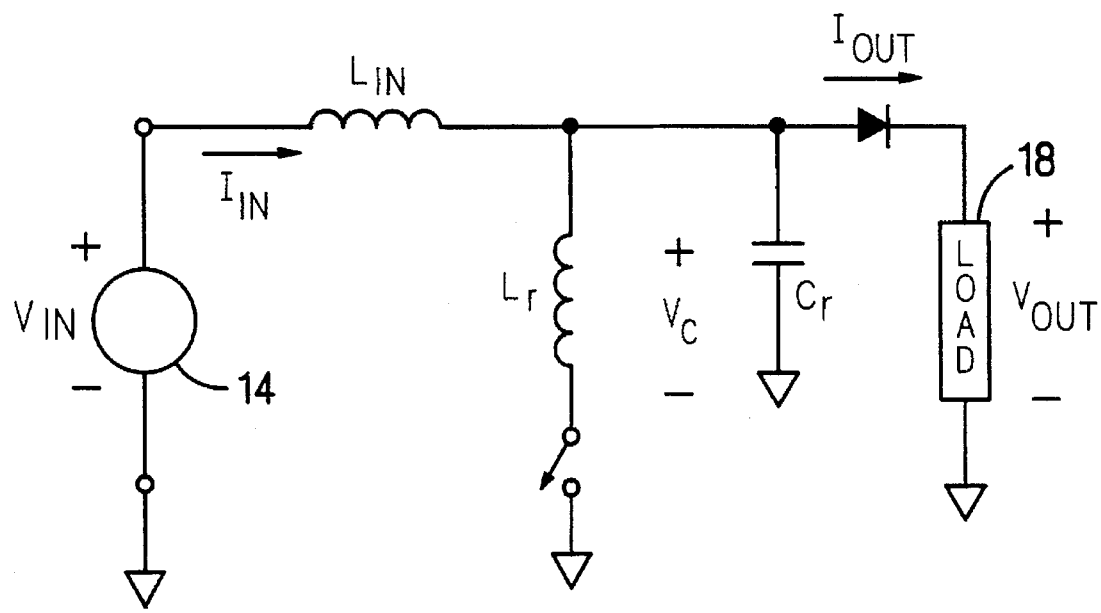
FIGS. 26A and 26B show a circuit schematic and waveforms, respectively, for a prior art ZCS buck converter.
Figure 26B:
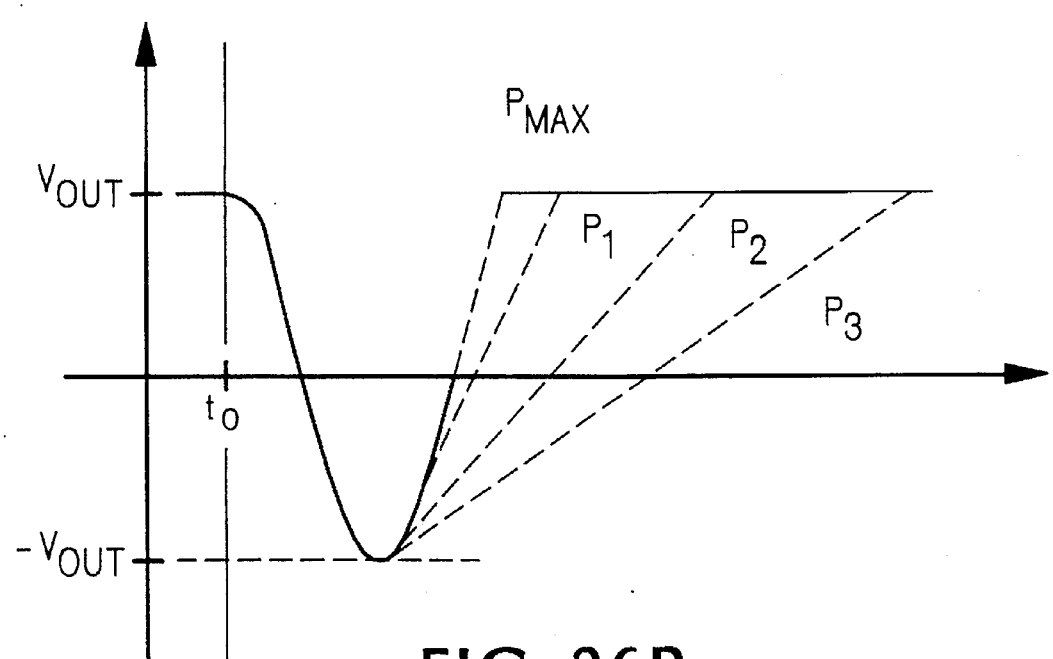

While the preceding description has focused on a limited number of implementations of a ZCS buck converter, the scheme can be applied to any ZCS converter topology. For example, FIG. 26A shows a prior art ZCS boost converter 370; FIG. 26B shows waveforms for the voltage Vc(t) in the converter, when operated in the half-wave mode, as the load is reduced from the maximum allowable load value, Pmax, to lower values, Pi>P2>P3, at a constant output voltage Vout>Vin. Like the half-wave ZCS buck converter, the operating frequency of the boost converter 370 will decline essentially linearly with load.

Figure 27A:
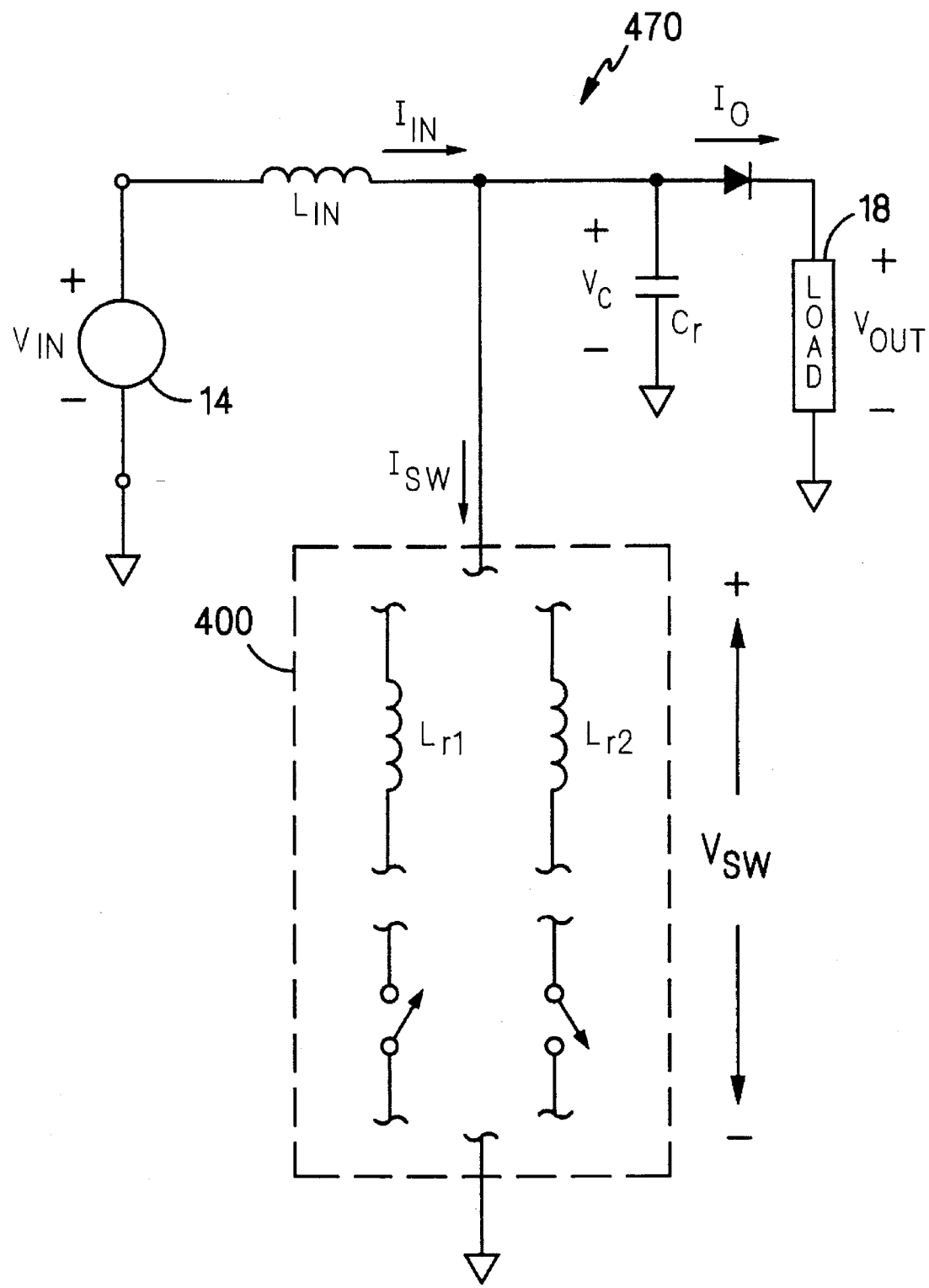
FIGS. 27A and FIGS. 27B through 27D show, respectively, a circuit schematic and operating waveforms for a ZCS buck converter.
Figure 27B:
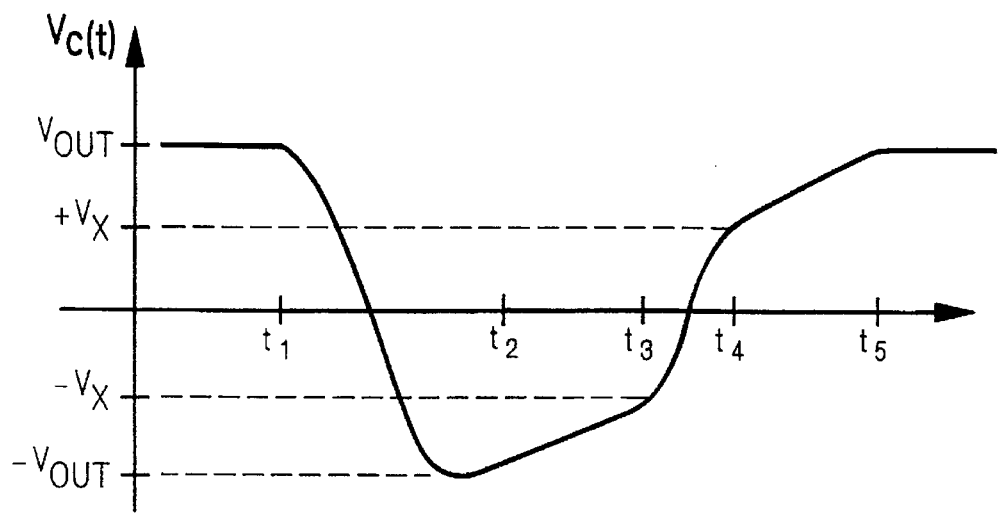
Figure 27C:
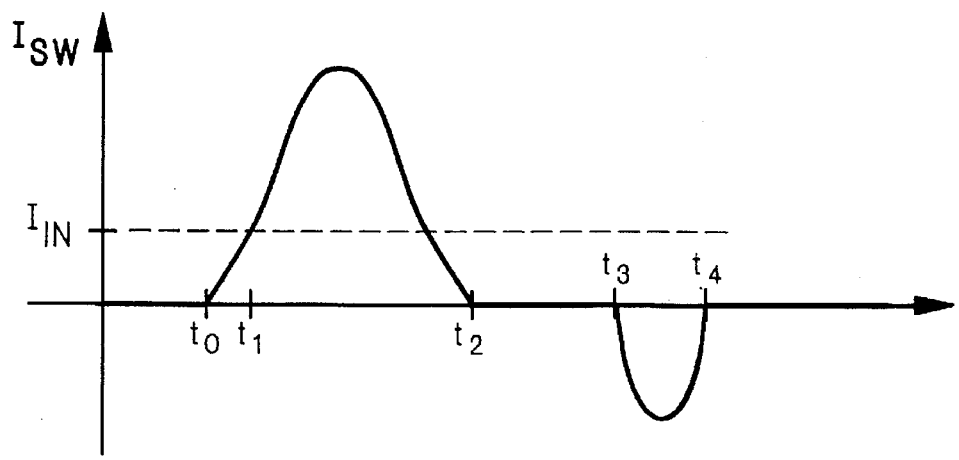
Figure 27D:
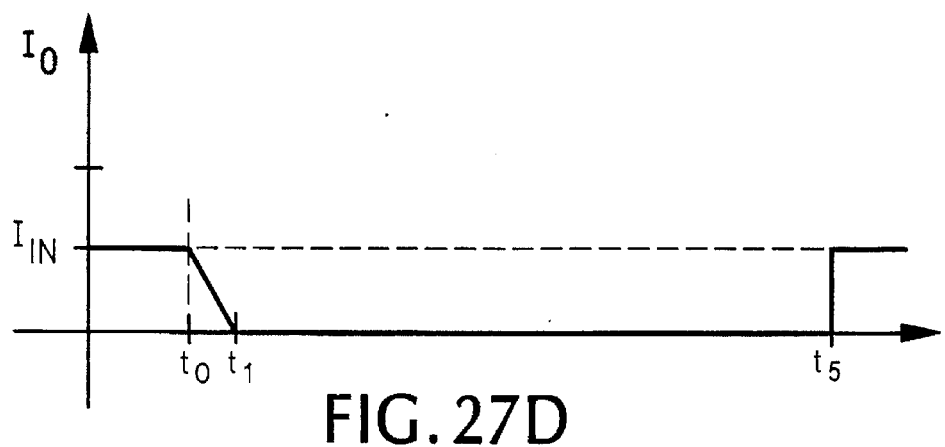

FIG. 27A shows a dual-mode ZCS boost converter 470 which corresponds to the topology of FIG. 26A but which is modified to include a multi-mode switch 400. The switch can be of the kind shown in FIGS. 11, 14 or 16A–16D, incorporating a dual-mode switch controller (not shown, but of the kind previously described) for controlling the forward and reverse flow of switch current, Isw, or it can be a switch of the kind shown in FIGS. 17 and 25, using a saturable inductor. At relatively high values of load the converter 470 will operate in a half-wave mode: the switch 400 will be opened upon the first zero-crossing of current, Isw, following switch closure and only positive Isw will flow. The voltage Vc(t) will appear as shown in FIG. 26B. Below some value of load, however, the switch 400 will be closed again at a time subsequent to the end of the initial half-wave flow of current provided that the voltage, Vc, is below zero volts. This is illustrated in FIGS. 27B, 27C and 27D. In the Figures the operating cycle begins with closure of the switch 400 at time t=to. Between times t=to and t=t1, the current Isw ramps up (FIG. 27C) as the current Io ramps down (FIG. 27D). The positive half-wave flow of current, Isw, ends at time t2, after which a reverse flow of Isw is blocked by the switch 400. At a time t3>t2, the voltage Vc(t2) (FIG. 27B) is below zero volts and the switch is closed again, causing a reverse flow of current, Isw, and reverse transfer of energy back to the input source 14, between times t3 and t4. This is accompanied by a symmetrical "ringup" of the voltage Vc about zero volts, from a value Vc(t3)=−Vx to a value Vc(t4)=+Vx. At time t=t4 positive flow of current Isw is blocked by the switch 400. Following time t=t4, the voltage Vc will continue to ramp up (at a rate dVc/dt=Iin/Cr) until it reaches a value Vout at time t=t5, at which point current, Io, will once again flow into the load 18. A dual-mode ZCS boost converter will provide the same benefits previously described for the dual-mode ZCS buck configuration: by setting a lower bound on converter operating frequency it allows for a smaller, more efficient, converter; in configurations using a saturable inductor in the multi-mode switch, the full efficiency potential of half-wave ZCS conversion, at elevated loads, may be more closely achieved.

Figure 28:
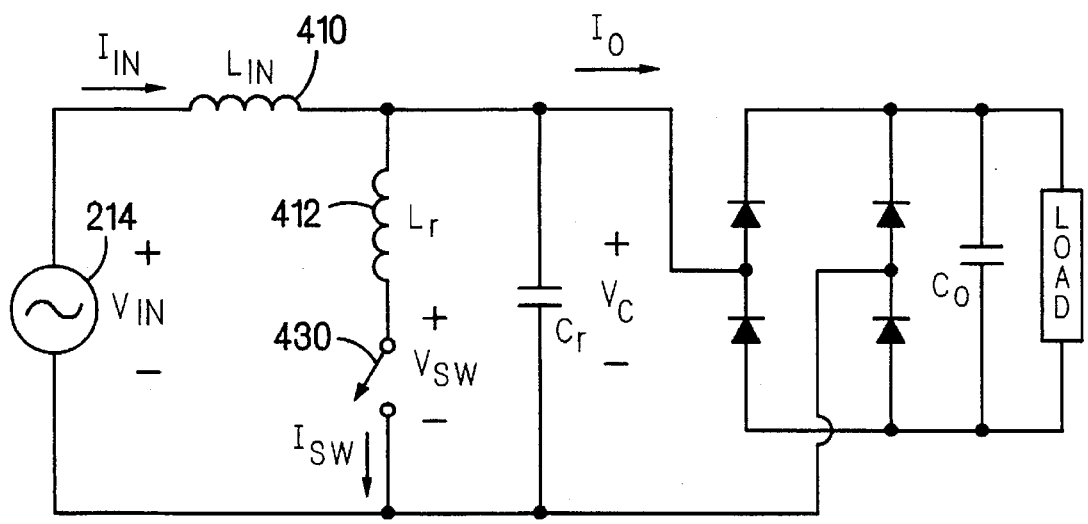
FIG. 28 shows a prior art AC-DC ZCS boost converter.

The invention is also applicable to ZCS converters which operate directly from bipolar input sources. One example of such a converter, of the kind described in Vinciarelli, et al, "AC to DC Boost Power Converters," U.S. patent application Ser. No. 08/274,991, is shown in FIG. 28. In the Figure the voltage, Vin, delivered by the bipolar input source 214 may assume either positive or negative values. In the half-wave operating mode, a bipolar switch 430 (e.g., one which is capable of blocking a bipolar voltage, Vsw, when open, and capable of conducting a bipolar current, Isw, when closed) is opened at the first zero-crossing of the current Isw following closure of the switch, resulting in a capacitor voltage waveform similar to that shown in FIG. 26B (with the exception that the polarity of the waveform will reverse for negative values of Vin).

Figure 16A:
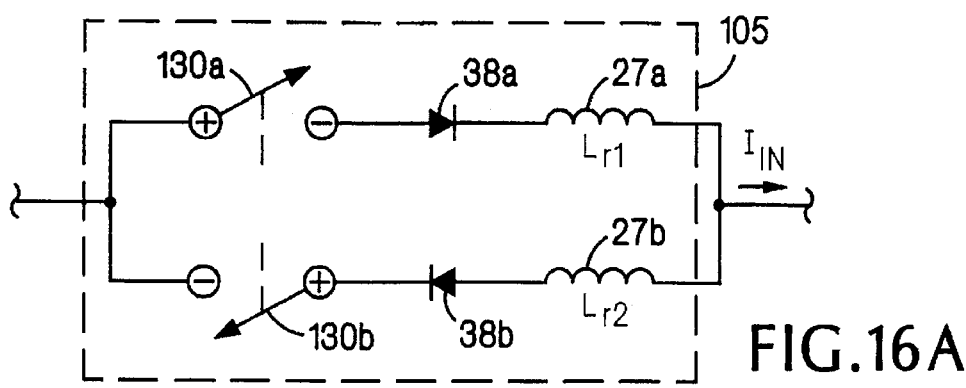
FIGS. 16A through 16D show embodiments of multi-mode switches.
Figure 16B:
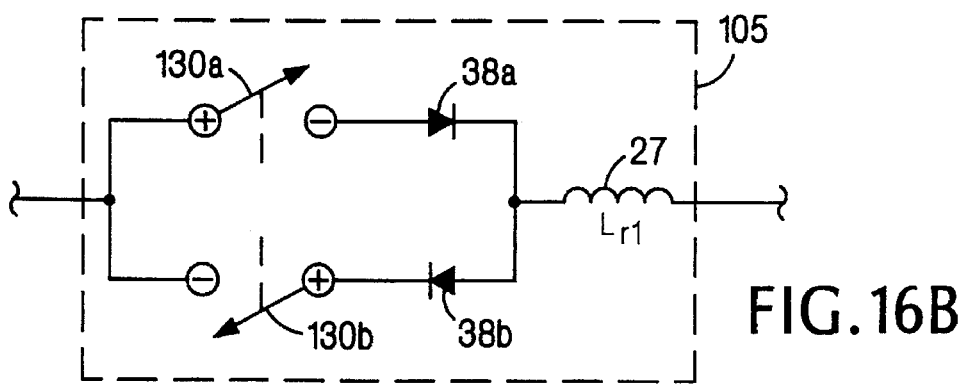
Figure 16C:
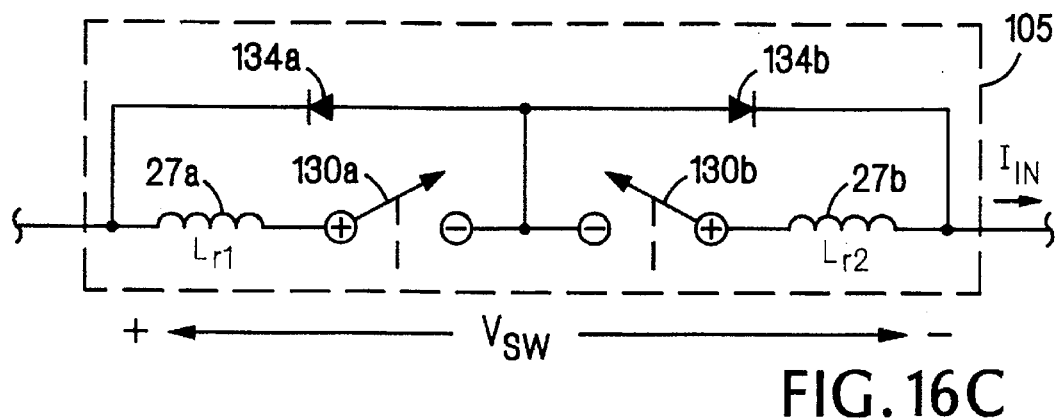
Figure 16D:
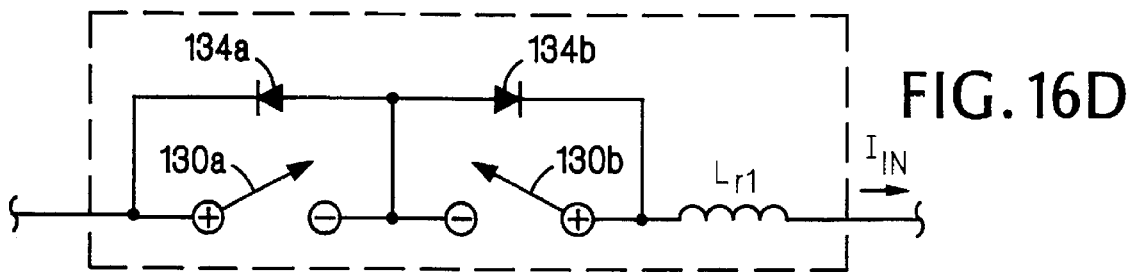
Figure 29:
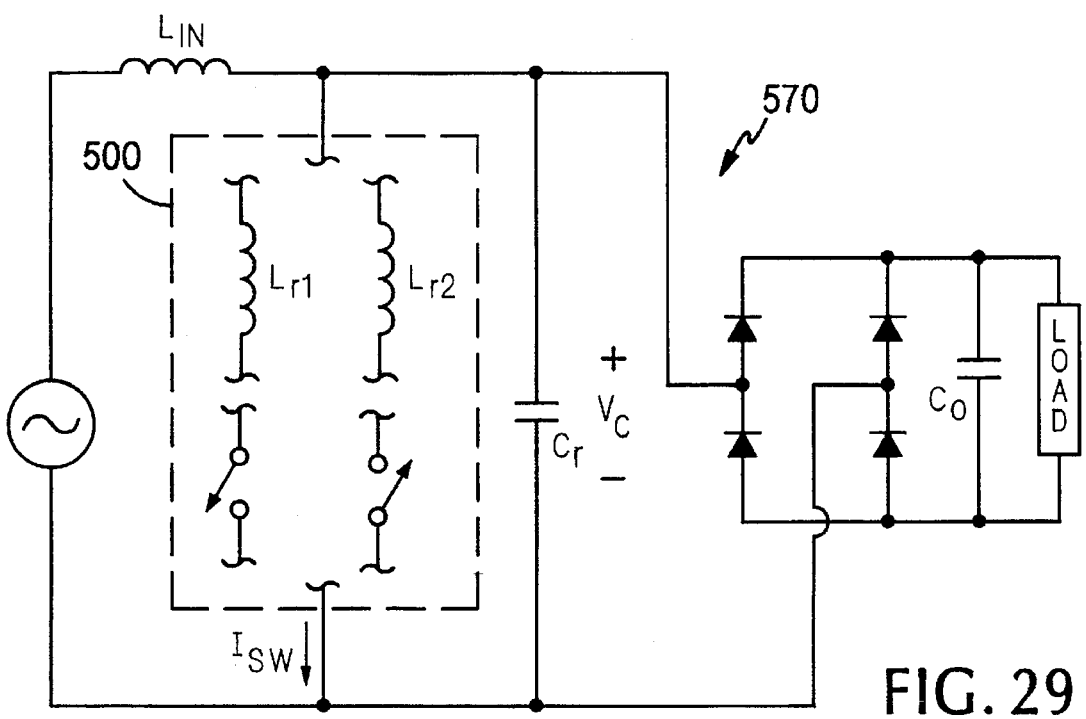
FIG. 29 shows an AC-DC ZCS boost converter.
Figure 30A:
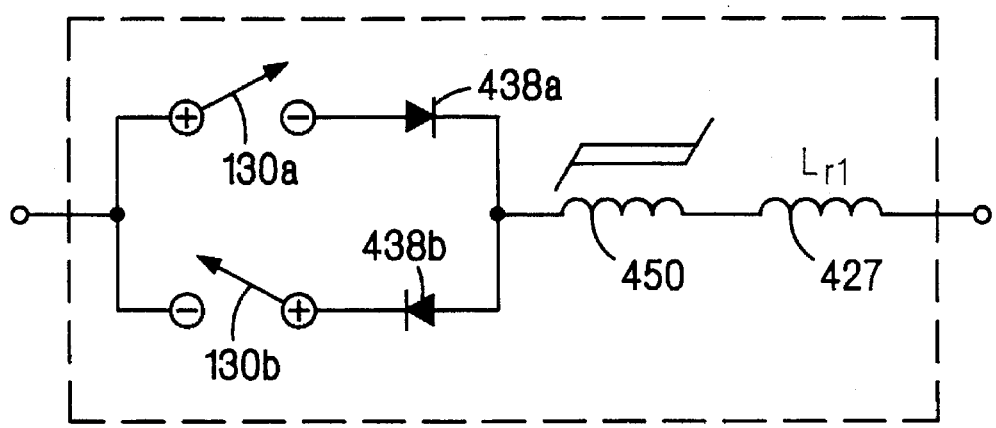
FIGS. 30A and 30B show bipolar multi-mode switches for use in converters.
Figure 30B:
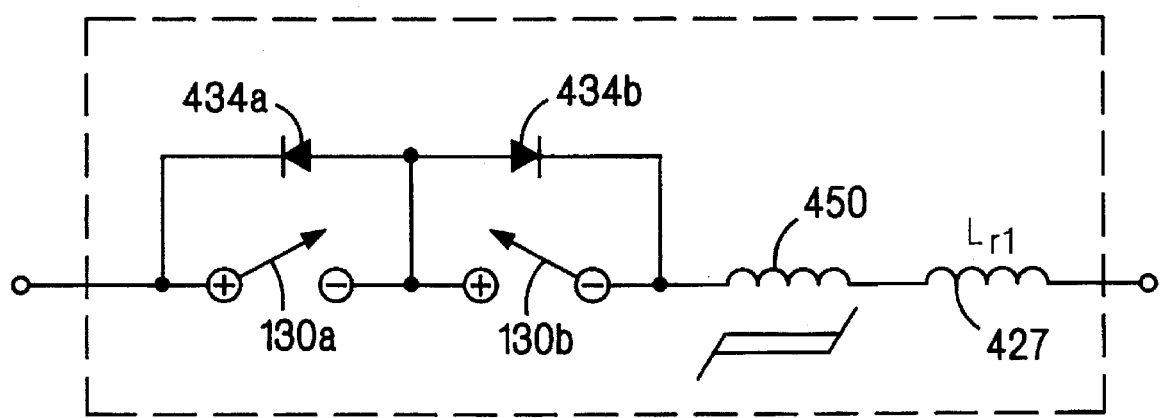

FIG. 29 shows a dual-mode ZCS AC to DC boost converter 570 which corresponds to the topology of FIG. 28 but which is modified to include a multi-mode switch 500. Since the multi-mode switch 500 must be a bipolar switch, multi-mode switches of the kind shown in FIGS. 11, 14 and 16A–16D may be used, but switches of the kind shown in FIGS. 17 and 25 may not. In application, switches of the kind shown in FIGS. 11, 16A and 16C provide no apparent benefit over those in FIGS. 14, 16B and 16D, since the values of the two inductors 27a, 27b must be set to the same value (because the roles of the two switches 130a, 130b, will reverse with the polarity of the source in terms of whether they carry energy forward from the input source toward the load or in reverse back from the capacitor 442 to the input source). Where it is desirable to provide different characteristic time constants for the forward and reverse energy transfer phases, two bipolar multi-mode switches (e.g., of the kind shown in FIG. 16B) comprising inductors of different values, may be paralleled and controlled in accordance with the polarity of the input source to. Bipolar multi-mode switches of the kind shown in FIGS. 30A and 30B, incorporating unidirectional switches 130a, 130b and diodes 434a, 434b, 438a, 438b in combination with either a saturable inductor 450 alone, or a saturable inductor in series with a linear inductor 427, may also be used in bipolar ZCS dual-mode converters. While the saturable inductors cannot replace the series blocking diodes in a bipolar ZCS dual-mode converter, their volt-second rating can be used to provide the "timing" of the automatic initiation of the reverse energy transfer phase as load is reduced.

Figure 31A:
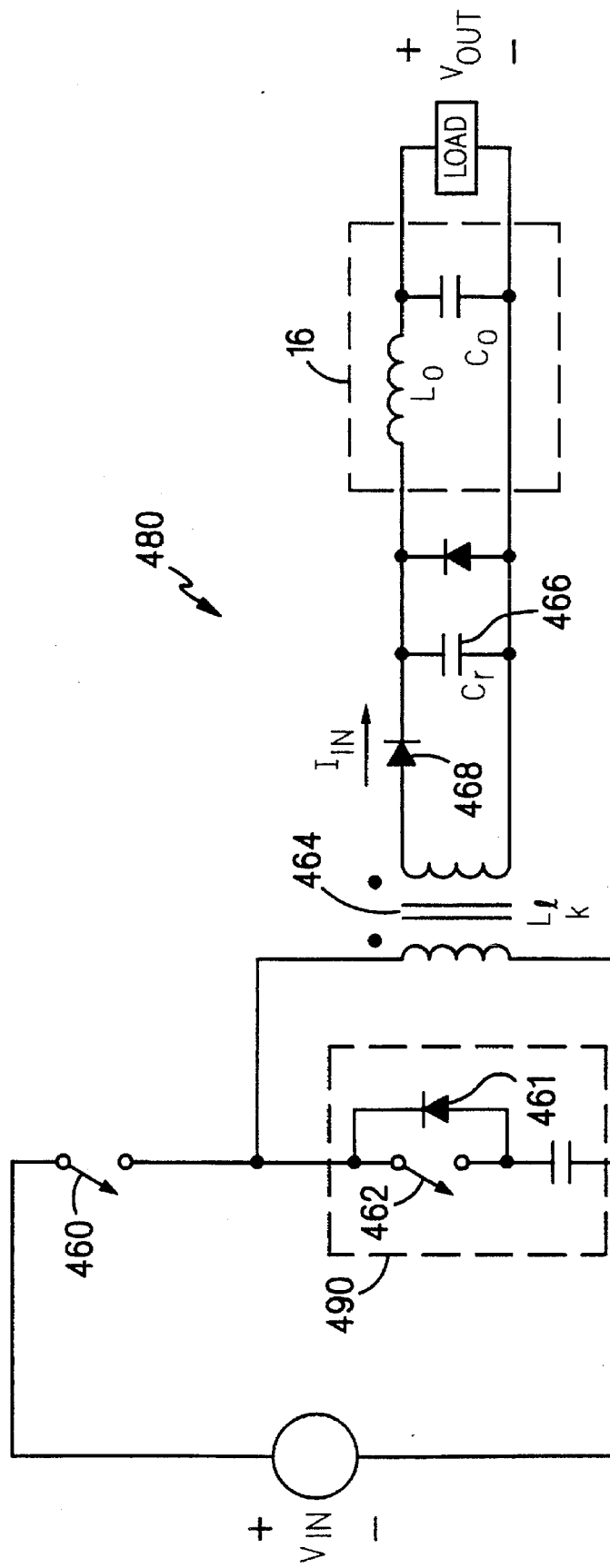
FIGS. 31A and 31B show schematics of a prior art ZCS forward converter and its dual-mode ZCS counterpart, respectively.
Figure 31B:
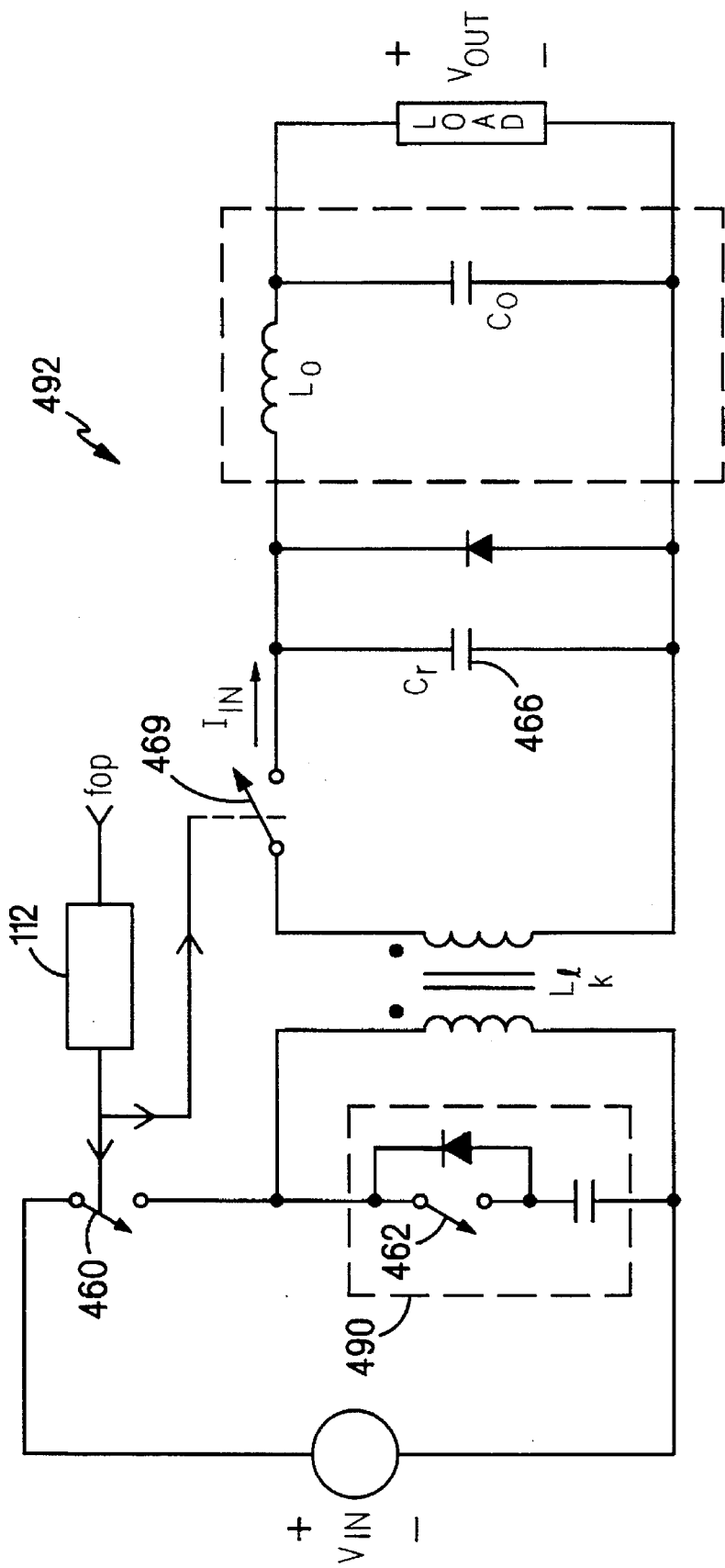
Figure 32:
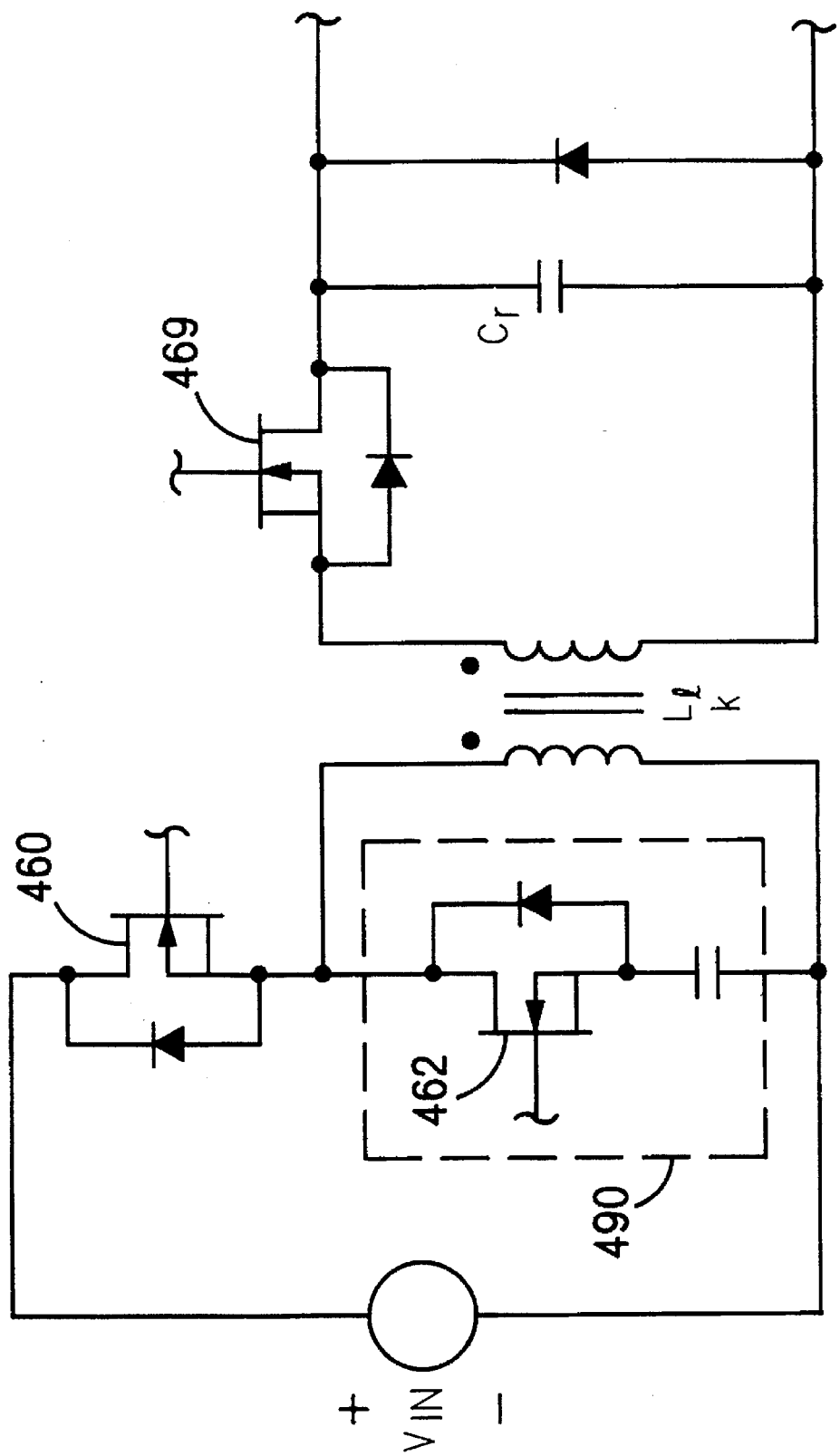
FIG. 32 shows a portion of an embodiment of the converter of FIG. 31B using MOSFET semiconductor switches.

Use of dual-mode control may also be used in galvanically isolated ZCS converters. For example, FIG. 31 shows an isolated half-wave ZCS forward converter 480 of the kind described in Vinciarelli, "Forward Converter Switching at Zero-Current," U.S. Pat. No. 4,415,959, November, 1983 (incorporated by reference). The converter includes a circuit 490 for resetting the magnetic core of the transformer of the kind described in Vinciarelli, "Optimal Resetting of the Transformer's Core in Single Ended Forward Converters," U.S. Pat. No. 4,441,146, April, 1984 (incorporated by reference). In operation the characteristic time constant for the converter is set by the value of the transformer 464 leakage inductance, L1, and the value of the capacitor 466, Cr. The main switch 460 is turned on and off at times when the forward current, Iin, is zero, and the reset switch 462 is controlled to be on when the main switch is off and to turn off prior to the main switch turning on. A dual-mode version of the ZCS converter 492 of FIG. 31A is shown in FIG. 31B. In the Figure the diode of FIG. 31A has been replaced with a second switch 469. A dual-mode controller 112 (e.g., of the kind shown in FIGS. 11A and 11B) turns the main switch 460 and the second switch 469 on and off simultaneously. The reset switch 490 is controlled as in the prior art converter: it is turned on when the main switch is off and is turned off just prior to the main switch turning on. In the converter of FIG. 31B, all of the switches 460, 469, 490 can be embodied as unidirectional switches, as is illustrated using MOSFETs in the partial schematic in FIG. 32.

In general, a dual-mode ZCS power converter would typically include: (1) a switching element combined with circuit elements (e.g., inductors, capacitors), the circuit elements serving to both define the characteristic time constant(s) for the rise and fall of the currents and voltages in the converter during each converter operating cycle and arranged so that the switching element may be opened and closed at times of zero current, and (2) means for performing dual-mode control of the switching element. Dual-mode control provides for two distinct operating modes. In a first operating mode a switching element is closed and opened once during each operating cycle, at consecutive times of zero current, to initiate a forward transfer of energy from the input source toward the load; in a second operating mode, a first closing and opening of a switching element, at consecutive times of zero current during a first phase of the operating cycle, associated with initiation of forward energy transfer from the input source toward the load, is followed a finite time later by a second phase during which a switching element is once again closed and opened at consecutive times of zero current, provided that operating conditions within the converter will allow for a reverse transfer of energy back to the input source.

Figure 33A:
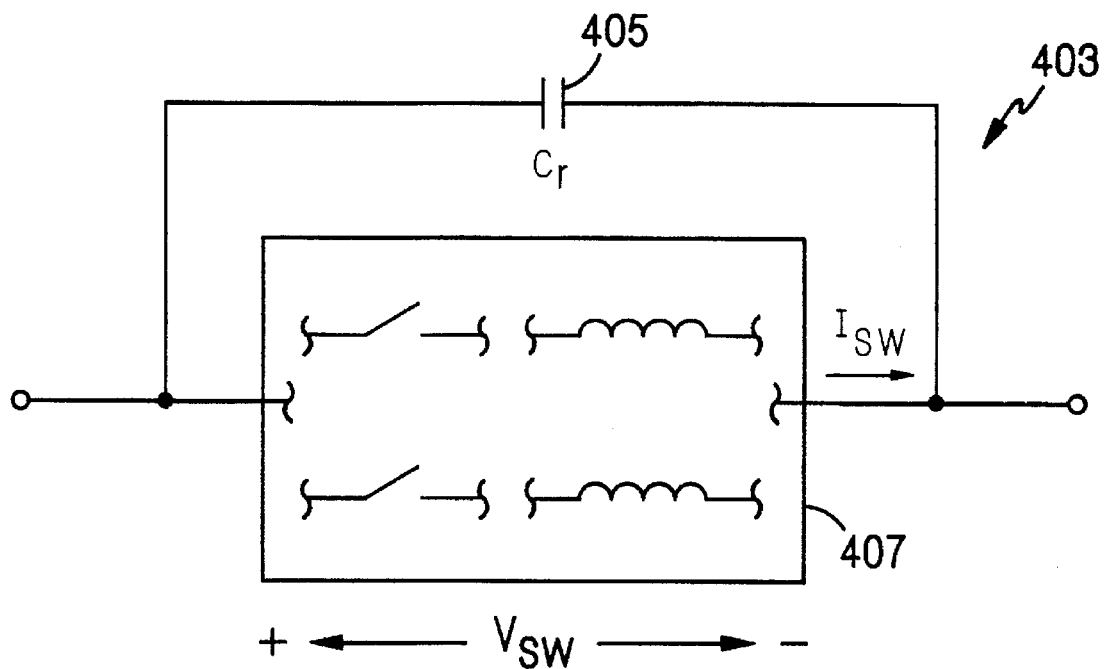
FIGS. 33A and 33B show M-Type and L-Type dual-mode resonant switches, respectively.
Figure 33B:
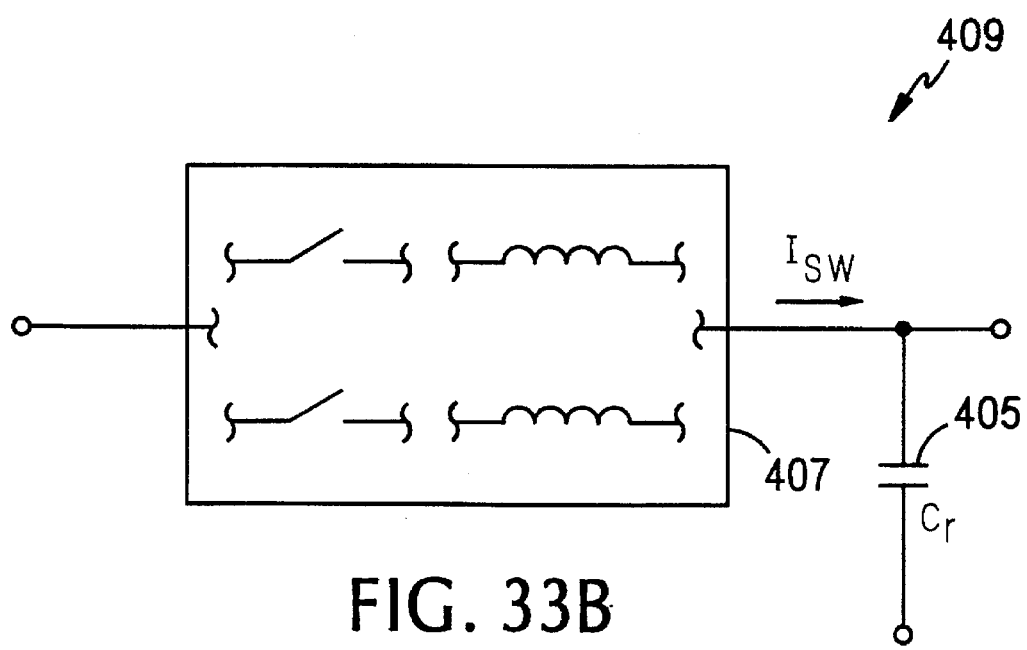

The multi-mode switch may, as illustrated in FIGS. 33A and 33B, be generalized into a family of multi-mode resonant switches. In accordance with the terminology used by Liu, et al, in "Resonant Switches—A Unified Approach to Improve Performances of Switching Converters," IEEE International Telecommunications Conference, 1984 Proceedings, pp. 344–351 (incorporated by reference), to describe different types of prior art resonant switches, the dual-mode resonant switch of FIG. 33A is referred to as an M-Type dual-mode resonant switch 403 and the dual-mode resonant switch of FIG. 33B is referred to as an L-Type dual-mode resonant switch 409. Both the M-Type and the L-Type dual-mode resonant switches include a multi-mode switch 407 and a capacitor 405. The multi-mode switch 407 can be any of the ones shown in FIGS. 11, 14 or 16A–16D, incorporating a dual-mode switch controller (not shown, but of the kind previously described) for controlling the forward and reverse flow of switch current, Isw, or it can be a switch of the kind shown in FIGS. 17, 25, 30A and 30B, using a saturable inductor. In general, inductance included in series with the switching element within the multi-mode switch 407 provides for closing of the switching element at times of zero current and a limit on the rate-of-change of switch current thereafter; the combination of the inductance and the capacitance 405 causes a sinusoidal time variation in the switch current, thereby providing a zero-crossing of current, subsequent to turn-on, at which to turn the switching element off. The dual-mode switch controller provides for two distinct operating modes for the dual-mode resonant switches 403, 409. In a first operating mode a switching element within the multi-mode switch 407 is closed and opened once during each operating cycle, at consecutive times of zero current, to initiate a flow of current, Isw, of a particular polarity; in a second operating mode, the first closing and opening of a switching element, at consecutive times of zero current during a first phase of the operating cycle associated with initiation of a flow of Isw at a particular polarity, is followed a finite time later by a second phase during which a switching element in the multi-mode switch 407 is closed and opened at consecutive times of zero current, provided that the second phase will allow for a flow of current Isw of an opposite polarity.

Other embodiments are within the scope of the following claims. As a general rule, for example, any ZCS power conversion topology which can be operated in the full-wave operating mode can be adapted to dual-mode control. Thus, any of the wide variety of full-wave ZCS converter topologies which are described in Lee, et al, "Zero-Current Switching Quasi-Resonant Converters Operating in a Full-Wave Mode," U.S. Pat. No. 4,720,667, Jan. 19, 1988 (incorporated by reference), including the buck (Lee, FIGS. 11A through 11F), boost (Lee, FIGS. 12A through 12F), buck-boost (Lee, FIGS. 14A through 14P), forward (Lee, FIGS. 15B and 15C), flyback (Lee, FIGS. 16B and 16C), Cuk (Lee, FIGS. 17C, 17D, 18B and 18C) and SEPIC topologies (Lee, FIGS. 19B and 19C), and those which are also described in Vinciarelli, et al, "Boost Switching Power Conversion," U.S. Pat. No. 5,321,348, Jun. 14, 1994 (incorporated by reference) may be adapted to dual-mode control, and each of these topologies (e.g., as shown in the referenced figures in Lee) will therefore have a corresponding dual-mode ZCS topology in accordance with the present invention (e.g., in each of the referenced figures in Lee the switch labeled S1 would be replaced with an appropriate multi-mode switch). The time delay between the initiation of half-wave forward current flow at the beginning of an operating cycle in a dual-mode ZCS converter, or in a dual-mode resonant switch, and the initiation of a reverse flow of current later in the cycle need not be a fixed delay but can be made variable to accommodate some particular application need or converter operating requirement.

What is claimed is:

1. A method for controlling the minimum operating frequency of a zero-current switching converter which transfers power from an input source for delivery to a time-varying load by opening and closing a switch at times of zero current flow, comprising in a first portion of each of a series of converter operating cycles, controlling said switch to initiate forward energy transfer from said input source, and in response to changes of said load, during each of some of the converter operating cycles and at times which are not contiguous with said first portion, controlling said switch to initiate reverse energy transfer to said input source.

2. The method of claim 1 further comprising causing a fixed time delay between the beginning of said first portion and the initiation of said reverse energy transfer.

3. The method of claim 1 further comprizing selectively adjusting the time delay between the beginning of said first portion and the initiation of said reverse energy transfer.

4. The method of claim 3 further comprising initiating the reverse energy transfer on the basis of a voltage measured across a capacitor.

5. The method of claim 1 further comprising adapting the volt-second characteristic of a saturable inductor to effect a &ontrolled time delay between the beginning of said first portion and the initiation of said reverse energy transfer.

6. The method of claim 1 further comprising initiating the reverse energy transfer if doing so will result in energy being transferred from said converter back to said input source.

* * * * *

UNITED STATES PATENT AND TRADEMARK OFFICE
CERTIFICATE OF CORRECTION

PATENT NO. : 5,668,466
DATED : September 16, 1997
INVENTOR(S) : Patrizio Vinciarelli et al.

It is certified that error appears in the above-identified patent and that said Letters Patent is hereby corrected as shown below:

Col. 4, line 21, change "ta ant tb" to --ta and tb--.

Col. 5, line 19, change "a Cuk converter a" to --a Cuk converter, a--.

Col. 9, line 15, change "T1=pi,sqrt(Lr1*Cr)" to --T1=pi*sqrt(Lr1*Cr)--.

Col. 12, line 34, change "increase the" to --increase in the--.

Col. 14, line 12, change "Tmin=pi,sqrt(Lr1,C) and Tmax=1.5,pi,sqrt(Lr1*C)" to --Tmin=pi*sqrt(Lr1*C) and Tmax=1.5*pi*sqrt(Lr1*C)--.

Col. 14, lines 30-31, change "VSb=2,vin*ts2=2,VSa" to --VSb=2*Vin*Ts2=2*VSa--.

Col. 18, line 41, change "comprizing" to --comprising--.

UNITED STATES PATENT AND TRADEMARK OFFICE
CERTIFICATE OF CORRECTION

PATENT NO. : 5,668,466
DATED : September 16, 1997
INVENTOR(S) : Patrizio Vinciarelli et al.

It is certified that error appears in the above-identified patent and that said Letters Patent is hereby corrected as shown below:

Col. 18, line 54, change "&ontrolled" to --controlled--.

Signed and Sealed this

Twenty-third Day of February, 1999

Attest:

Q. TODD DICKINSON

*Attesting Officer*   *Acting Commissioner of Patents and Trademarks*